(12) United States Patent
Kurokawa

(10) Patent No.: US 10,597,065 B2
(45) Date of Patent: Mar. 24, 2020

(54) VERTICAL POSITION ADJUSTMENT DEVICE FOR STEERING WHEEL

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/774,910

(22) PCT Filed: Dec. 2, 2016

(86) PCT No.: PCT/JP2016/085878
§ 371 (c)(1),
(2) Date: May 9, 2018

(87) PCT Pub. No.: WO2017/094877
PCT Pub. Date: Jun. 8, 2017

(65) Prior Publication Data
US 2018/0327018 A1 Nov. 15, 2018

(30) Foreign Application Priority Data

Dec. 3, 2015 (JP) .................................. 2015-236862

(51) Int. Cl.
*B62D 1/189* (2006.01)
*B62D 1/184* (2006.01)

(52) U.S. Cl.
CPC ............. *B62D 1/189* (2013.01); *B62D 1/184* (2013.01)

(58) Field of Classification Search
CPC .............................. B62D 1/189; B62D 1/184
See application file for complete search history.

(56) References Cited

U.S. PATENT DOCUMENTS

| 4,657,281 A | 4/1987 | Haldric et al. |
| 5,394,767 A | 3/1995 | Hoblingre et al. |

(Continued)

FOREIGN PATENT DOCUMENTS

| CN | 103889821 A | 6/2014 |
| CN | 104024084 A | 9/2014 |

(Continued)

OTHER PUBLICATIONS

International Search Report dated Jan. 17, 2017 issued by the International Searching Authority in Application No. PCT/JP2016/085878 (PCT/ISA/210), Partial translation.

(Continued)

*Primary Examiner* — Faye M Fleming
(74) *Attorney, Agent, or Firm* — Sughrue Mion, PLLC

(57) ABSTRACT

In a clamped state where the interval between both the pressing parts is reduced and both the clamped plate parts are clamped by both the support plate parts, vertical distances from an outer peripheral surface of the adjustment rod to an upper surface and a lower surface of an inner surface of one through-hole of both the through-holes are different, vertical distances from the outer peripheral surface of the adjustment rod to an upper surface and a lower surface of an inner surface of the other through-hole of both the through-holes are different, and sides, where the vertical distance from the outer peripheral surface of the adjustment rod to the inner surface is smaller, are on opposite sides with respect to the vertical direction in one through-hole and the other through-hole.

9 Claims, 16 Drawing Sheets

(56) References Cited

U.S. PATENT DOCUMENTS

| | | | |
|---|---|---|---|
| 10,093,341 B2* | 10/2018 | Johta | B62D 1/189 |
| 2009/0241721 A1 | 10/2009 | Inoue et al. | |
| 2014/0210196 A1 | 7/2014 | Moriyama et al. | |
| 2014/0252753 A1 | 9/2014 | Schnitzer | |
| 2014/0338491 A1 | 11/2014 | Moriyama | |
| 2015/0122075 A1 | 5/2015 | Mihara et al. | |
| 2015/0166094 A1 | 6/2015 | Davies et al. | |
| 2018/0346012 A1* | 12/2018 | Kurokawa | B62D 1/184 |
| 2019/0152511 A1* | 5/2019 | Shiroishi | B62D 1/192 |

FOREIGN PATENT DOCUMENTS

| | | |
|---|---|---|
| CN | 104470790 A | 3/2015 |
| EP | 0592278 A1 | 4/1994 |
| EP | 2765057 A1 | 8/2014 |
| FR | 2579159 A1 | 9/1986 |
| JP | 63-32962 U | 3/1988 |
| JP | 2009-73378 A | 4/2009 |
| JP | 2009-227181 A | 10/2009 |
| JP | 2011-152872 A | 8/2011 |
| JP | 2015-155288 A | 8/2015 |
| WO | 2013/094305 A1 | 6/2013 |

OTHER PUBLICATIONS

Written Opinion dated Jan. 17, 2017 issued by the International Searching Authority in Application No. PCT/JP2016/085878 (PCT/ISA/237).
Communication dated Oct. 4, 2018, from the European Patent Office in counterpart European Application No. 16870812.1.
Communication dated Nov. 25, 2019, issued by the Chinese Patent Office in counterpart Chinese Application No. 201680070197.3.

* cited by examiner

VERTICAL POSITION ADJUSTMENT DEVICE FOR STEERING WHEEL

TECHNICAL FIELD

The present invention relates to improvements on a vertical position adjustment device for steering wheel. The adjustment device can adjust a vertical position of a steering wheel for steering an automobile, for example.

RELATED ART

A steering device for automobile is configured as shown in FIG. 15, for example. The steering device for automobile is configured to transmit rotation of a steering wheel 1 to an input shaft 3 of a steering gear unit 2, and to push and pull a pair of left and right tie-rods 4, 4 in association with rotation of the input shaft 3, thereby applying a steering angle to front wheels. The steering wheel 1 is supported and fixed to a rear end portion of a steering shaft 5. The steering shaft 5 is rotatably supported to a cylindrical steering column 6 with being inserted in the steering column 6 in an axial direction. Also, a front end portion of the steering shaft 5 is connected to a rear end portion of an intermediate shaft 8 via a universal joint 7. A front end portion of the intermediate shaft 8 is connected to the input shaft 3 via a separate universal joint 9.

Regarding the steering device configured as described above, a steering device including a tilt mechanism for adjusting a vertical position of the steering wheel 1 and a telescopic mechanism for adjusting a position in a front and rear position in correspondence to a physique and a driving posture of a driver has been known (for example, refer to Patent Document 1). In the shown structure, in order to configure the tilt mechanism, an upper front end portion of a housing 10 fixed to a front end portion of the steering column 6 is supported to a vehicle body 11 so that it can be swingably displaced by a tilt shaft 12 arranged in a width direction (the width direction indicates a width direction of the vehicle body and coincides with the left and right direction. This applies to the specification and the claims.). Also, a displacement bracket 13 is provided on a lower surface of an axially intermediate part of the steering column 6. A support bracket 14 is provided with clamping the displacement bracket 13 from both sides in the width direction. The support bracket 14 is formed with long holes 15 for tilt adjustment, which are long in a vertical direction (the vertical direction indicates a direction perpendicular to the axial direction of the steering column 6 and the width direction. For example, as shown in FIGS. 2 to 10, 11B, 12 to 14 and 17, the vertical direction coincides with the vertical direction, as seen from a section perpendicular to the axial direction of the steering column 6. This applies to the specification and the claims.). The displacement bracket 13 is formed at portions, which align with portions of both the long holes 15 for tilt adjustment, with long holes 16 for telescopic adjustment, which are long in the front and rear direction (the axial direction of the steering column 6). An adjustment rod 17 is inserted in the long holes 15 for tilt adjustment and the long holes 16 for telescopic adjustment in the width direction. Also, the steering shaft 5 and the steering column 6 are configured to be expanded and contracted, in conformity to the above-described configuration. When an adjustment lever (not shown) provided at one end portion of the adjustment rod 17 is operated, a force of clamping the displacement bracket 13 from both sides in the width direction by the support bracket 14 is adjusted, so that a position of the steering wheel 1 can be adjusted in the vertical direction and in the front and rear direction.

A more specific structure of the steering device having a position adjustment device for steering wheel is described with reference to FIGS. 16 and 17.

A front part of an outer column 18 arranged at a rear side of the steering column 6 and a rear part of an inner column 19 arranged at a front side are slidably fitted, so that an entire length of the steering column 6 can be extended or shortened. For example, the front part of the outer column 18 manufactured by die-casting a light alloy is provided with a slit 20, so that an inner diameter of the front part of the outer column 18 can be elastically expanded and contracted. Also, a pair of left and right clamped plate parts 21a, 21b is provided at parts at which the slit 20 is clamped from both the left and right sides, and the displacement bracket 13 is configured by both the clamped plate parts 21a, 21b. Also, both the clamped plate parts 21a, 21b are formed with long holes 16a, 16b for telescopic adjustment, which are long in the front and rear direction. Also, a pair of left and right support plate parts 22a, 22b provided to the support bracket 14 is arranged at portions at which the displacement bracket 13 is clamped from both the left and right sides. Both the support plate parts 22a, 22b are formed with long holes 15a, 15b for tilt adjustment, each of which has a partial arc shape about a tilt shaft 12 (refer to FIG. 15) and is long in the vertical direction. The adjustment rod 17 is inserted into both the long holes 15a, 15b for tilt adjustment and both the long holes 16a, 16b for telescopic adjustment in the width direction.

Also, one end portion of the adjustment rod 17 in the axial direction is provided with a thrust bearing 25. The other end portion of the adjustment rod 17 in the axial direction is provided with a nut 24. A part of the adjustment rod 17, which is close to one end of an intermediate part in the axial direction, is provided with a cam device 28 configured by an adjustment lever 23, a drive-side cam 26 and a non-drive-side cam 27. In this way, a lock mechanism configured to expand and reduce an interval between inner surfaces of both the support plate parts 22a, 22b on the basis of swinging of the adjustment lever 23 is configured. Although the adjustment rod 17 can vertically move along both the long holes 15a, 15b for tilt adjustment, it is not rotated in association with the swinging of the adjustment lever 23.

When adjusting a position of the steering wheel 1, the adjustment lever 23 is caused to swing in a predetermined direction (in general, downward) to rotate the drive-side cam 26 in an unlock direction. Then, a width dimension of the cam device 28 is reduced and an interval between the non-drive-side cam 27 and the nut 24 is expanded. As a result, surface pressures of contact parts between the inner surfaces of both the support plate parts 22a, 22b and outer surfaces of both the clamped plate parts 21a, 21b are reduced or lost, the inner diameter of the front end portion of the outer column 18 is elastically enlarged, and a surface pressure of a contact part between an inner peripheral surface of the front end portion of the outer column 18 and an outer peripheral surface of the rear end portion of the inner column 19 is reduced. In this unclamped state, a position of the steering wheel 1 can be adjusted in the vertical direction and in the front and rear direction within a range in which the adjustment rod 17 can move in both the long holes 15a, 15b for tilt adjustment and both the long holes 16a, 16b for telescopic adjustment.

In order to keep the steering wheel 1 at a desired position, the steering wheel 1 is moved to the desired position and the adjustment lever 23 is then caused to swing in a reverse direction (generally, upward). Thereby, the drive-side cam 26 is rotated in a lock direction, which is a rotation direction upon switching to a lock state. Then, the width dimension of the cam device 28 is enlarged, and the interval between the inner surfaces of both the support plate parts 22a, 22b is reduced. As a result, the surface pressures of the contact parts between the inner surfaces of both the support plate parts 22a, 22b and the outer surfaces of both the clamped plate parts 21a, 21b are increased, the inner diameter of the front end portion of the outer column 18 is elastically reduced, and the surface pressure of the contact part between the inner peripheral surface of the front end portion of the outer column 18 and the outer peripheral surface of the rear end portion of the inner column 19 is increased. For this reason, in this clamped state, it is possible to keep the steering wheel 1 at a position after the adjustment.

According to the position adjustment device for the steering wheel configured as described above, in the clamped state at which the position of the steering wheel 1 can be kept, vertical gaps 29a, 29b, 29c, 29d are respectively formed between the outer peripheral surface of the adjustment rod 17 and the inner surfaces (the upper surface and lower surface) of both the long holes 16a, 16b for telescopic adjustment, as exaggeratingly shown in FIG. 17. Specifically, the vertical gaps 29a, 29b are respectively formed between the outer peripheral surface of the adjustment rod 17 and an upper surface and a lower surface of the inner surface of one (the left, in FIG. 17) long hole 16a for telescopic adjustment in the width direction, and the vertical gaps 29c, 29d are respectively formed between the outer peripheral surface of the adjustment rod 17 and an upper surface and a lower surface of the inner surface of the other (the right, in FIG. 17) long hole 16b for telescopic adjustment in the width direction.

Also, according to the above-described conventional structure, a size of the vertical gap 29a between the upper surface of the inner surface of one long hole 16a for telescopic adjustment in the width direction and the outer peripheral surface of the adjustment rod 17 and a size of the vertical gap 29c between the upper surface of the inner surface of the other long hole 16b for telescopic adjustment in the width direction and the outer peripheral surface of the adjustment rod 17 are the same. Also, a size of the vertical gap 29b between the lower surface of the inner surface of one long hole 16a for telescopic adjustment in the width direction and the outer peripheral surface of the adjustment rod 17 and a size of the vertical gap 29d between the lower surface of the inner surface of the other long hole 16b for telescopic adjustment in the width direction and the outer peripheral surface of the adjustment rod 17 are the same. That is, according to the above-described conventional structure, a magnitude relation of the vertical gaps from the outer peripheral surface of the adjustment rod 17 to the upper surface and lower surface of the inner surface of the long hole 16a for telescopic adjustment is the same in the one long hole 16a for telescopic adjustment in the width direction and the other long hole 16b for telescopic adjustment in the width direction. For this reason, even in the clamped state, the outer column 18 can be substantially displaced downward by amounts corresponding to the sizes of both the vertical gap 29a, 29c and can be substantially displaced upward by amounts corresponding to the sizes of both the vertical gap 29b, 29d with respect to the adjustment rod 17. Therefore, the above structure has room for improvement in standpoints of improving support rigidity impression of the steering wheel 1 to improve a driver's steering feel.

CITATION LIST

Patent Documents

Patent Document 1: JP-A-2009-227181

SUMMARY OF THE INVENTION

Problems to be Solved

The present invention has been made in view of the above situations, and is to implement a structure capable of improving support rigidity impression of a steering wheel in a vertical direction to improve a driver's steering feel.

Means for Solving Problems

A vertical position adjustment device for steering wheel includes a pair of clamped plate parts, a pair of through-holes, a pair of support plate parts, a pair of long holes for tilt adjustment, an adjustment rod, a pair of pressing parts, and an expansion/contraction mechanism.

The pair of clamped plate part is provided at parts of the steering column with being spaced from each other in a width direction, and configures a displacement-side bracket.

Also, the pair of through-holes is formed to penetrate both the clamped plate parts in the width direction.

Also, the pair of support plate parts is provided at parts of a support bracket supported to a vehicle body with clamping both the clamped plate parts from both sides in the width direction.

Also, the pair of long holes for tilt adjustment is long holes, which are respectively long in a vertical direction, and is formed to penetrate both the support plate parts in the width direction.

Also, the adjustment rod is provided with being inserted in both the through-holes and both the long holes for tilt adjustment in the width direction.

Also, the pair of pressing parts is provided at parts of the adjustment rod, which protrude from outer surfaces of both the support plate parts.

Also, the expansion/contraction mechanism is a cam device, for example, and is provided to expand and reduce an interval between both the pressing parts.

In the meantime, when the steering wheel is configured to be positionally adjusted not only in the vertical direction but also in the front and rear direction, each of the through-holes is configured as a long hole for telescopic adjustment that is long in the front and rear direction, and when the steering wheel is configured to be positionally adjusted only in the vertical direction, each of the through-holes is configured as a simple circular hole.

In particular, in a clamped state where the interval between both the pressing parts is reduced and both the clamped plate parts are clamped by both the support plate parts, vertical distances from an outer peripheral surface of the adjustment rod to an upper surface and a lower surface of an inner surface of one through-hole of both the through-holes may be different. Also, vertical distances from the outer peripheral surface of the adjustment rod to an upper surface and a lower surface of an inner surface of the other through-hole of both the through-holes may be different. Also, sides where the vertical distance from the outer peripheral surface of the adjustment rod to the inner surface is smaller (including cases where the vertical gap is zero and is equal to or smaller than zero (the state where there is an interference)) may be on opposite sides with respect to the vertical direction in one through-hole and the other through-hole.

In an unclamped state where the interval between both the pressing parts is expanded and a force of clamping both the clamped plate parts by both the support plate parts is released, the inner surface of one through-hole of both the through-holes and the inner surface of the other through-hole may be contacted to the outer peripheral surface of the adjustment rod at only one side in the vertical direction, respectively.

Also, for example, a central axis of one through-hole and a central axis of the other through-hole may be configured to deviate from each other in the vertical direction with being arranged in a horizontal direction (a direction perpendicular to the clamped plate parts).

Alternatively, the central axis of one through-hole and the central axis of the other through-hole may be configured to coincide with each other and may be inclined in the vertical direction with respect to the horizontal direction.

Also, for example, a lower hole formed in each of the clamped plate parts may be mounted therein with an annular sleeve made of an elastic material, and each of the through-holes may be configured by an inner surface of the sleeve.

Alternatively, a hole formed in each of the clamped plate parts may be used as each of the through-holes, without providing the separate member such as the sleeve. In other words, each of the clamped plate parts may be directly formed with each of the through-holes.

Also, for example, a central axis of one lower hole formed in one clamped plate part of both the clamped plate parts and a central axis of the other lower hole formed in the other clamped plate part may be configured to deviate from each other in the vertical direction.

For example, even when the sleeve to be mounted in one lower hole and the sleeve to be mounted in the other lower hole are made to be the same, the central axes of both the through-holes may be configured to deviate from each other in the vertical direction.

For example, the central axis of one lower hole formed in one clamped plate part of both the clamped plate parts and the central axis of the other lower hole formed in the other clamped plate part may be made to coincide with each other. The central axis of one through-hole configured by the inner surface of one sleeve to be mounted in one lower hole and the central axis of the other through-hole configured by the inner surface of the other sleeve to be mounted in the other lower hole may be configured to deviate from each other in the vertical direction.

For example, as one sleeve and the other sleeve, sleeves having different thickness dimensions of an upper end portion and a lower end portion may be used.

Also, when each of the through-holes is configured by the inner surface of the sleeve, for example, in the clamped state, the inner surface of any one through-hole and the outer peripheral surface of the adjustment rod may be contacted with an interference in the vertical direction.

Also, for example, in the clamped state, vertical gaps having different sizes may be respectively provided between both the upper and lower surfaces of the inner surface of one through-hole and the outer peripheral surface of the adjustment rod, and vertical gaps having different sizes may be respectively provided between both the upper and lower surfaces of the inner surface of the other through-hole and the outer peripheral surface of the adjustment rod. In other words, like the invention defined in claim 6, the gaps may be provided at all parts in the vertical direction without contacting the upper and lower surfaces of the inner surface of each of the through-holes and the outer peripheral surface of the adjustment rod each other with an interference.

Also, for example, bending rigidity of one support plate part of both the support plate parts may be made higher than bending rigidity of the other support plate part.

Also, the central axis of the through-hole, which is arranged at one support plate part-side in the width direction, of both the through-holes may be arranged to be closer to the steering column in the vertical direction than the central axis of the other through-hole (the through-hole arranged at the other support plate part-side). The outer peripheral surface of the adjustment rod may be urged toward a surface, which is distant from the steering column in the vertical direction, of the upper and lower surfaces of the inner surface of the through-hole arranged in one support plate part-side, by an elastic member (the outer peripheral surface of the adjustment rod may be pressed to the distant surface).

Effects of the Invention

According to the vertical position adjustment device for steering wheel configured as described above, it is possible to improve support rigidity impression of the steering wheel in the vertical direction, thereby improving a driver's steering feel.

That is, in the clamped state, the vertical distances from the outer peripheral surface of the adjustment rod to the upper surface and lower surface of the inner surface of one through-hole are made to be different from each other, and the vertical distances from the outer peripheral surface of the adjustment rod to the upper surface and lower surface of the inner surface of the other through-hole are also made to be different from each other. Also, the sides where the vertical distance from the outer peripheral surface of the adjustment rod to the inner surface is smaller are on opposite sides with respect to the vertical direction in one through-hole and the other through-hole.

For this reason, as compared to the above-described conventional structure where the magnitude relation of the vertical distances from the outer peripheral surface of the adjustment rod to the upper surface and lower surface of the inner surface is the same in one through-hole and the other through-hole, it is possible to suppress a distance (then amount of displacement) within which the steering column can be substantially displaced relative to the adjustment rod in the vertical direction. Accordingly, it is possible to improve the support rigidity impression of the steering wheel in the vertical direction, thereby improving the driver's steering feel.

DETAILED DESCRIPTION OF EMBODIMENTS

First Example of Embodiment

Figure 15:
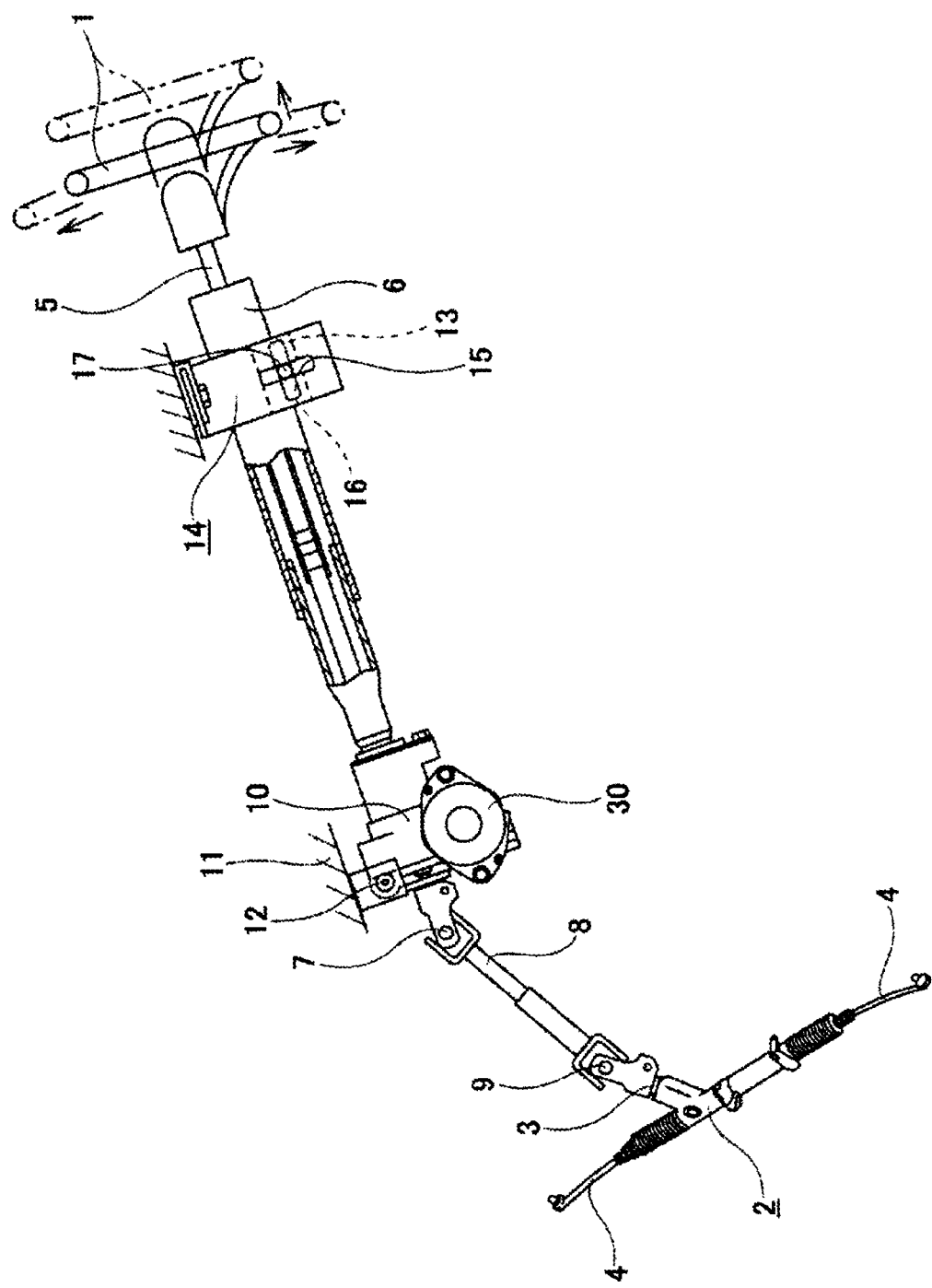
FIG. 15 is a partial side view depicting an example of a steering device.
Figure 16:
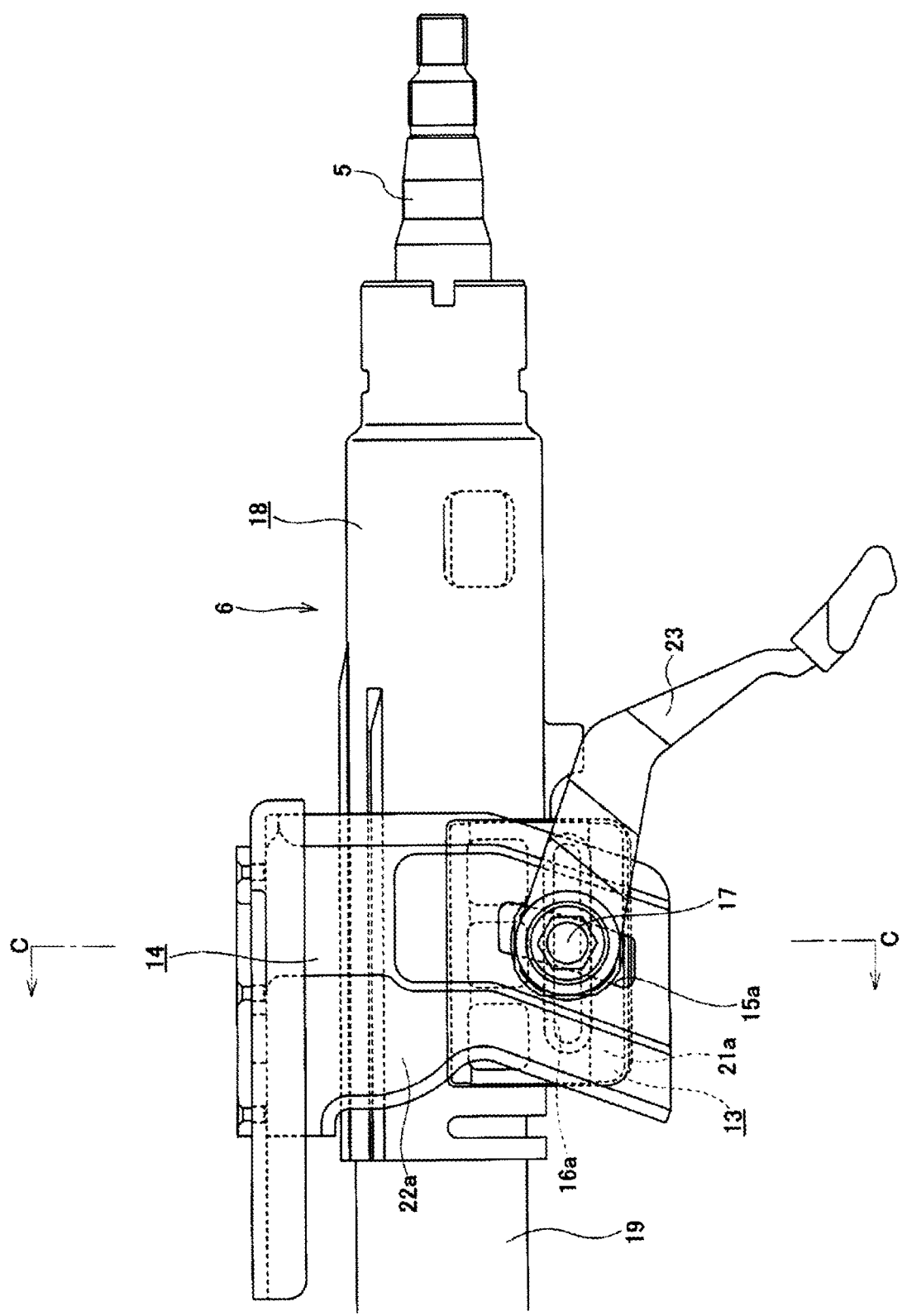
FIG. 16 is a partial side view for illustrating a specific structure of a position adjustment device for steering wheel.
Figure 17:
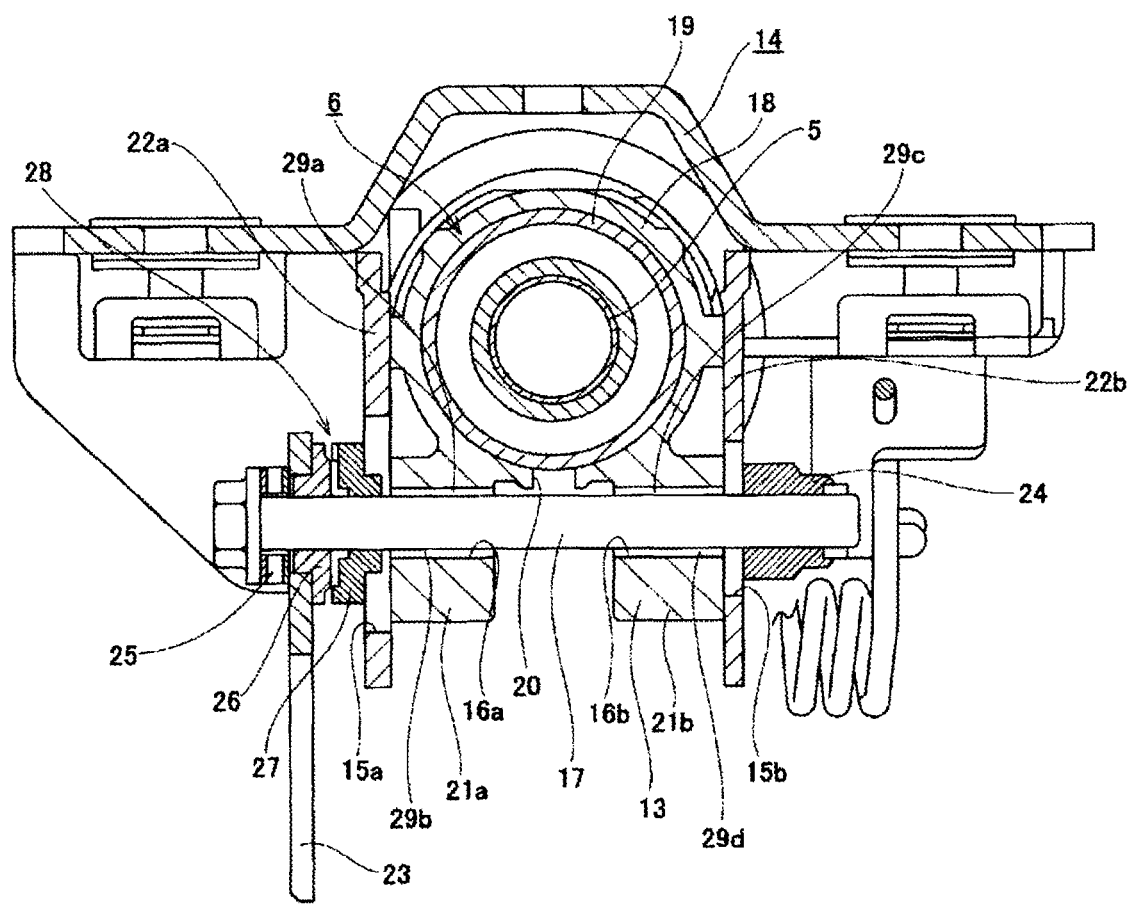
FIG. 17 is a sectional view taken along a line C-C of FIG. 16.

A first example of an embodiment will be described with reference to FIGS. 1 to 4. In a steering device to which a vertical position adjustment device for steering wheel of the first example is applied, a steering shaft 5a is rotatably supported inside a cylindrical steering column 6a supported to a vehicle body, via a plurality of rolling bearings (not shown). The steering wheel 1 (refer to FIG. 15) is fixed to a rear end portion of the steering shaft 5a more protruding rearward than a rear end opening of the steering column 6a.

Also, an electric motor 30, which is a power source for applying an auxiliary force to a front end portion of the steering column 6a, is supported to a housing 10a fixed to the front end portion of the steering column 6a. Output torque (auxiliary force) of the electric motor 30 is applied to the steering shaft 5a via a decelerator provided in the housing 10a. A support pipe 31 is arranged in the width direction on an upper part of the housing 10a. The support pipe 31 is inserted by a bolt (not shown), which is a tilt shaft, so that the housing 10a is swingably supported to a part of the vehicle body.

The steering device of the first example includes a tilt mechanism for adjusting a vertical position of the steering wheel 1 and a telescopic mechanism for adjusting a position in the front and rear direction, in correspondence to a physique and a driving posture of a driver.

In order to configure the telescopic mechanism, the steering column 6a has such a configuration that a front end portion of an outer column 18a arranged at the rear is loosely fitted to a rear end portion of an inner column 19a arranged at the front to be relatively displaced in the axial direction. In this way, an entire length of the steering device can be extended and shortened. Also, the outer column 18a is supported to a support bracket 14a so that it can be moved in the front and rear direction. Also, the steering shaft 5a rotatably supported inside the steering column 6a has such a structure that an inner shaft 32 and an outer shaft 33 are combined by spline engagement or the like so as to transmit torque and to be expanded and contracted. Meanwhile, in the first example, the outer column 18a is entirely configured by die-casting a light alloy, for example. In the meantime, although not shown, the steering column 6a may have such a configuration that a front end portion of the inner column 19a arranged at the rear is loosely fitted to a rear end portion of the outer column 18a arranged at the front to be relatively displaced in the axial direction.

Also, in order to configure the tilt mechanism, the steering column 6a is supported to the vehicle body so that it can be swingably displaced about the tilt shaft mounted in the width direction, and the outer column 18a is supported to the support bracket 14a so that it can be moved in the vertical direction.

Also, in order to support the outer column 18a to the support bracket 14a to be moveable in the front and rear direction and in the vertical direction, a slit 20a extending in the axial direction is formed at an upper portion of a part close to the front end of the outer column 18a. Thereby, the part close to the front end of the outer column 18a is configured as a notched cylinder, so that an inner diameter of the part close to the front end can be elastically expanded and contracted. A pair of clamped plate parts 21c, 21d configuring a displacement bracket 13a is provided at parts, which are an upper surface of the part close to the front end of the outer column 18a and are configured to clamp the slit 20a from both sides in the width direction. Also, both the clamped plate parts 21c, 21c are formed therein with long holes 16c, 16d for telescopic adjustment penetrating the clamped plate parts in the width direction and elongated in the front and rear direction (the axial direction of the outer column 11a). In the first example, both the long holes 16c, 16d for telescopic adjustment correspond to the pair of through-holes defined in the claims.

The support bracket 14a is made of a metal plate having sufficient stiffness such as steel, aluminum-based alloy or the like. The support bracket 14a has an attachment plate part 34, and a pair of support plate parts 22c, 22d. The attachment plate part 34 is supported to the vehicle body in normal times. However, upon a collision accident, the attachment plate part is separated forward on the basis of a shock of a secondary collision, thereby allowing the outer column 18a to be displaced forward. To this end, a rear end edge of the attachment plate part 34 is formed with a pair of opened notches 35, 35. Both the notches 35, 35 are respectively engaged with engagement capsules 36 fixed to the vehicle body by a fixing member such as a bolt, a stud or the like.

Figure 3A:
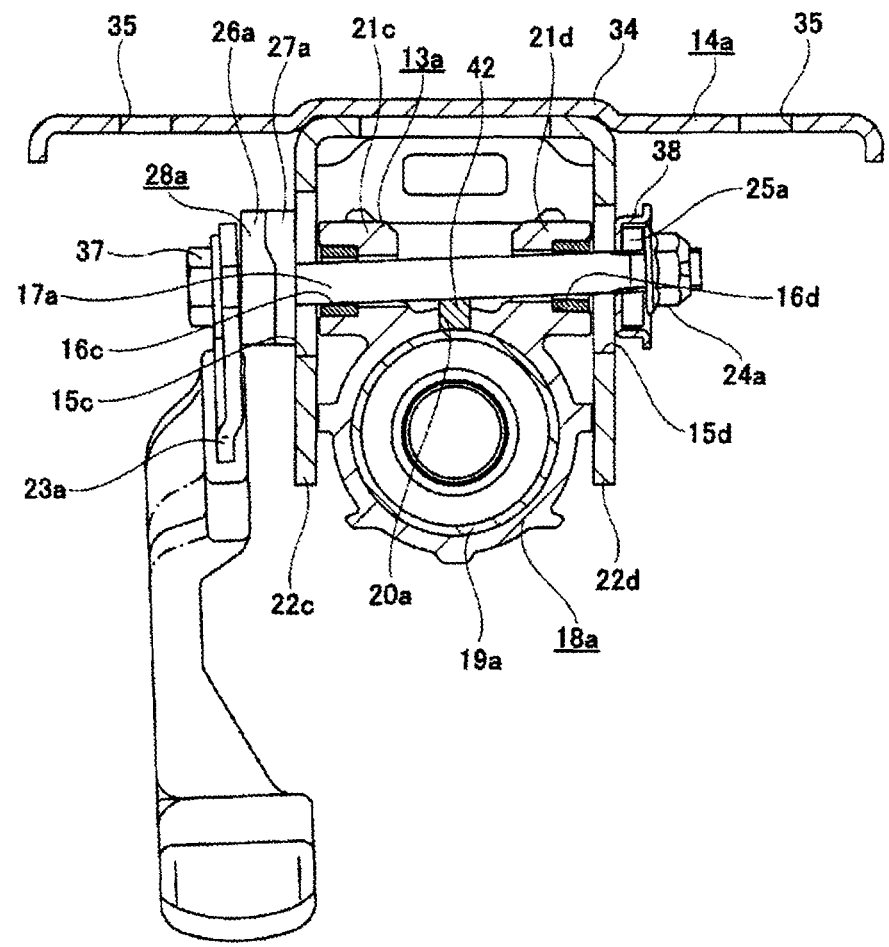
FIG. 3A is a view equivalent to an A-A section of FIG. 1 in an unclamped state.
Figure 3B:
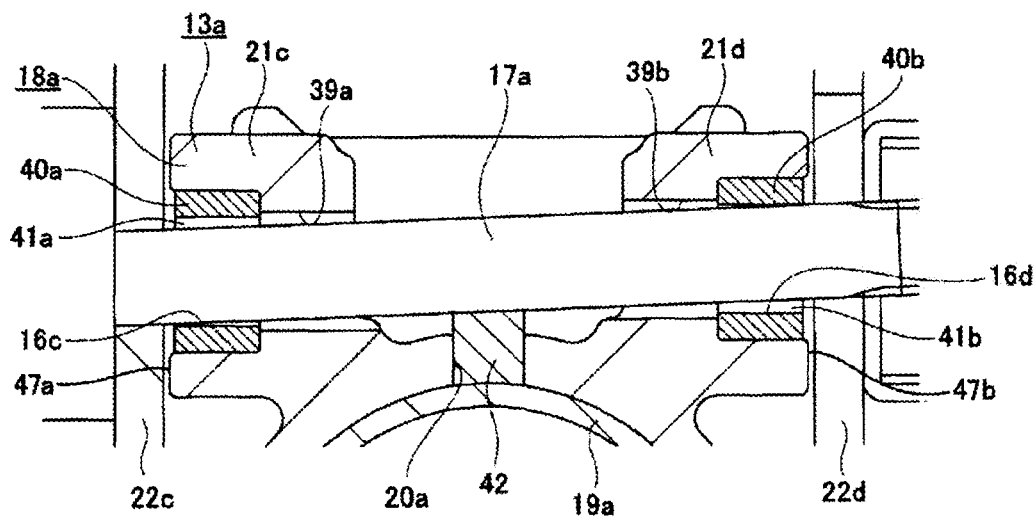
FIG. 3B is a partially enlarged view of FIG. 3A.
Figure 4A:
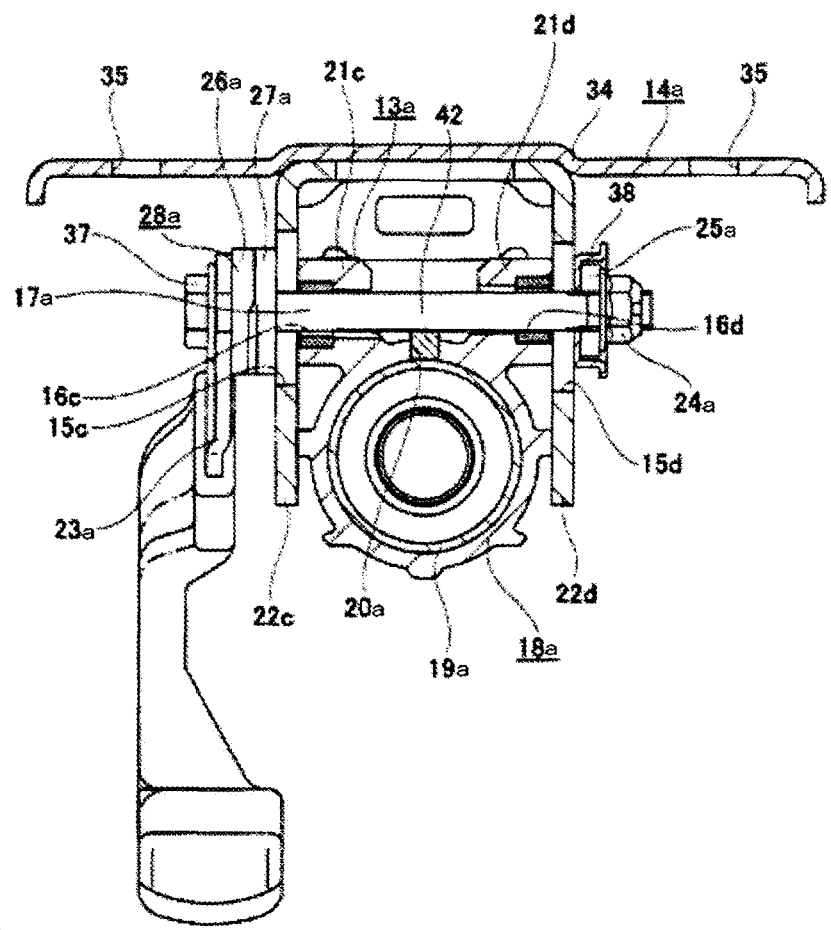
FIG. 4A is a view equivalent to the A-A section of FIG. 1 in a clamped state.
Figure 4B:
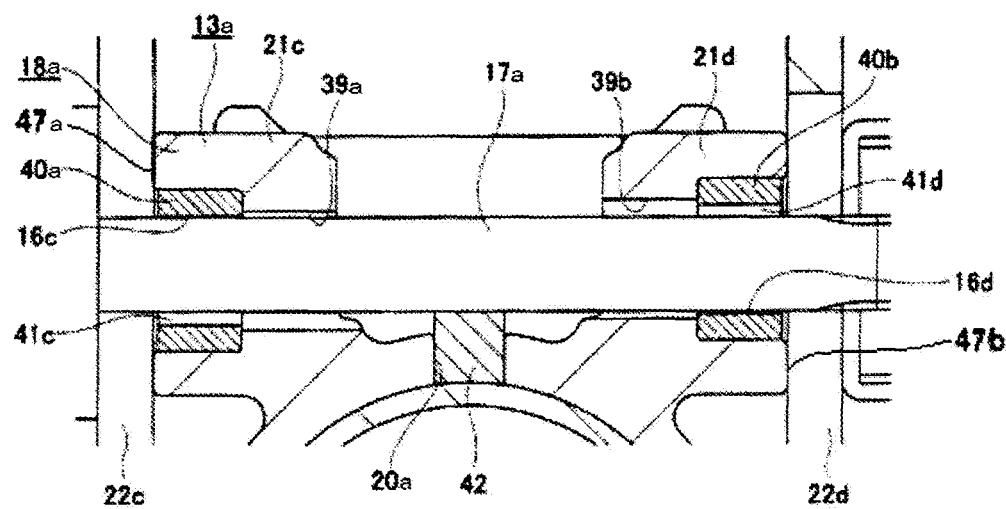
FIG. 4B is a partially enlarged view of FIG. 4A.

Both the support plate parts 22c, 22d hang downward from the attachment plate part 34. Both the support plate parts 22c, 22d are provided in parallel with each other with clamping the part close to the front end of the outer column 18a from both sides in the width direction. Also, portions of both the support plate parts 22c, 22d, which face each other (coincide with each other) in the width direction and coincide with portions of the respective long holes 16c, 16d for telescopic adjustment in the front and rear direction, are respectively formed with long holes 15c, 15d for tilt adjustment, which are long in the vertical direction. An adjustment rod 17a is inserted in the respective long holes 16c, 16d for telescopic adjustment and the respective long holes 15c, 15d for tilt adjustment, in the width direction. Also, in the first example, as shown in FIGS. 3 and 4, a guide member 42 made of an elastic material such as a rubber and having a rectangular section is provided in the slit 20a formed in the outer column 18a. An upper surface of the guide member 42 supports a lower surface of an intermediate part of the adjustment rod 17a in the width direction, from below.

Also, a non-drive-side cam 27a, a drive-side cam 26a, and an adjustment lever 23a are arranged in corresponding order from the support plate part 22c between a head 37 formed at one end portion (the left end portion in FIGS. 3 and 4) of the adjustment rod 17a in the axial direction and one (the left in FIGS. 3 and 4) support plate part 22c of both the support plate parts 22c, 22d in the width direction. The non-drive-side cam 27a and the drive-side cam 26a configure a cam device 28a. A pressing plate 38 and a thrust bearing 25a are arranged in corresponding order from the support plate part 22d between a nut 24a screwed to a male screw portion formed at the other end portion (the right end portion in FIGS. 3 and 4) of the adjustment rod 17a in the axial direction and the other (the right in FIG. 1) support plate part 22d of both the support plate parts 22c, 22d in the width direction. Thereby, based on a swinging operation of the adjustment lever 23a, the drive-side cam 26a is rotated relative to the non-drive-side cam 27a, so that a width dimension (an axial dimension) of the cam device 28a can be expanded and contracted.

In the first example, the pressing plate 38 and the non-drive-side cam 27a provided to the portions of the adjustment rod 17a, which protrude from outer surfaces of both the support plate parts 22c, 22d, correspond to the pair of pressing parts defined in the claims. Likewise, the cam device 28a corresponds to the expansion/contraction mechanism defined in the claims.

When adjusting a position of the steering wheel 1, the adjustment lever 23a is rotated in a predetermine direction (in general, downward) to contract the width dimension of the cam device 28a and to expand a distance between the non-drive-side cam 27a and the pressing plate 38. As a result, a distance between the inner surfaces of both the support plate parts 22c, 22d is increased, and surface pressures of contact parts between the inner surfaces of both the support plate parts 22c, 22d and the outer surfaces of both the clamped plate parts 21c, 21d are reduced or lost (the force of clamping the outer surfaces is released). In this state, since the support force of the support bracket 14a to the displacement bracket 13a is reduced or lost, the outer column 18a can be displaced within a range in which the adjustment rod 17a can move in both the long holes 16c, 16d for telescopic adjustment and both the long holes 15c, 15d for tilt adjustment. By the displacement, it is possible to adjust the position (one or both of positions in the vertical direction and in the front and rear direction) of the steering wheel 1.

In contrast, in order to keep the steering wheel 1 at a desired position, the adjustment lever 23a is rotated in a direction (generally, upward) opposite to the predetermined direction to expand the width dimension of the cam device 28a and to shorten the distance between the non-drive-side cam 27a and the pressing plate 38. As a result, the inner surfaces of both the support plate parts 22c, 22d and the outer surfaces of both the clamped plate parts 21c, 21d are strongly contacted and the vertical position of the steering wheel 1 is fixed. At the same time, the diameter of the part close to the front end of the outer column 18a to which both the clamped plate parts 21c, 21d are provided is contracted, and an inner peripheral surface of the front end portion of the outer column 18a and an outer peripheral surface of the rear end portion of the inner column 19a are strongly contacted. Then, the steering column 6a cannot be expanded or contracted, so that the position of the steering wheel 1 in the front and rear direction is fixed. As a result, the steering wheel 1 can be kept at a position after the adjustment.

The basic configuration of the steering device of the first example is as described above. Subsequently, features of the first example are described in detail.

Figure 1:
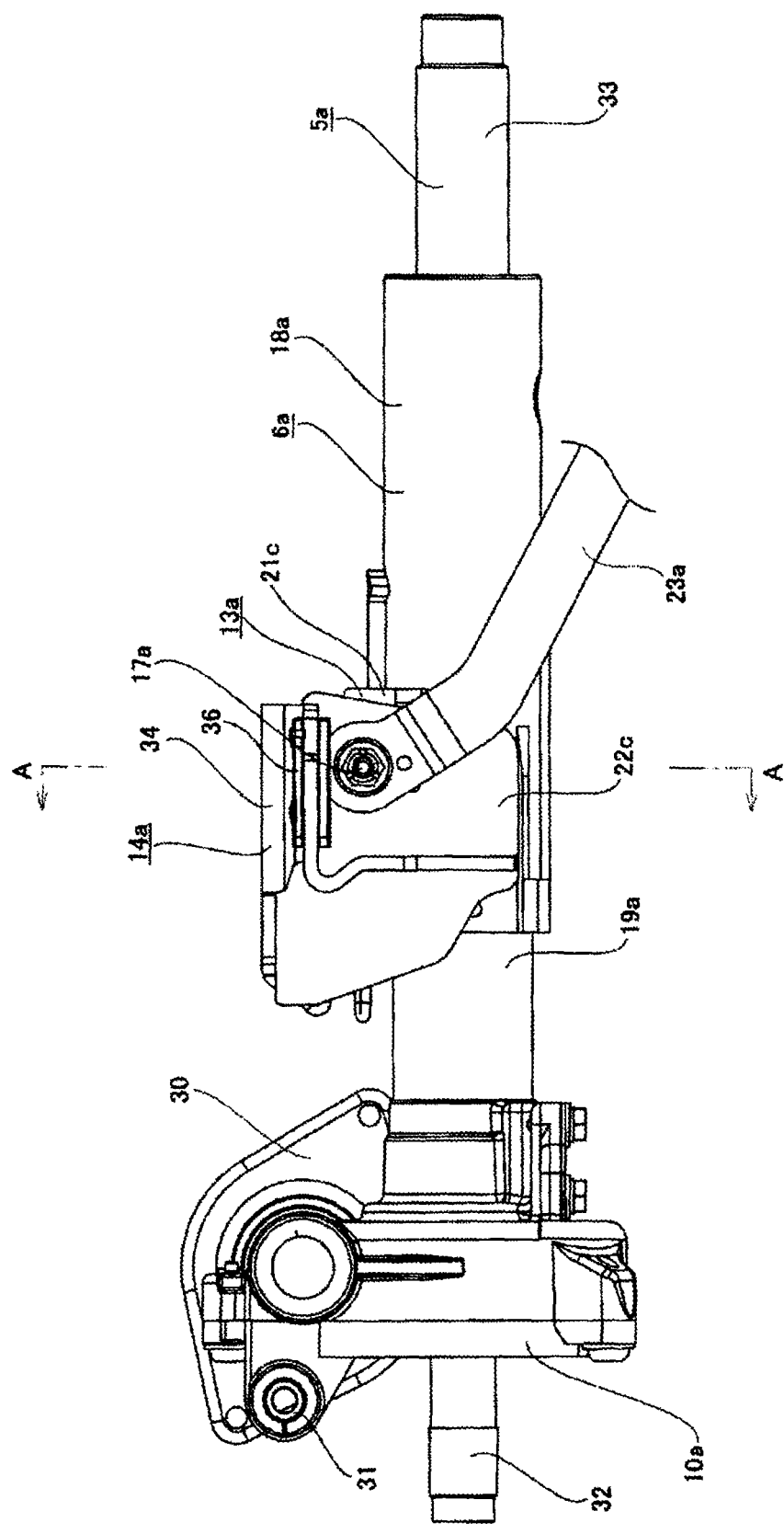
FIG. 1 is a partial side view of a steering device, depicting a first example of an embodiment.
Figure 2:
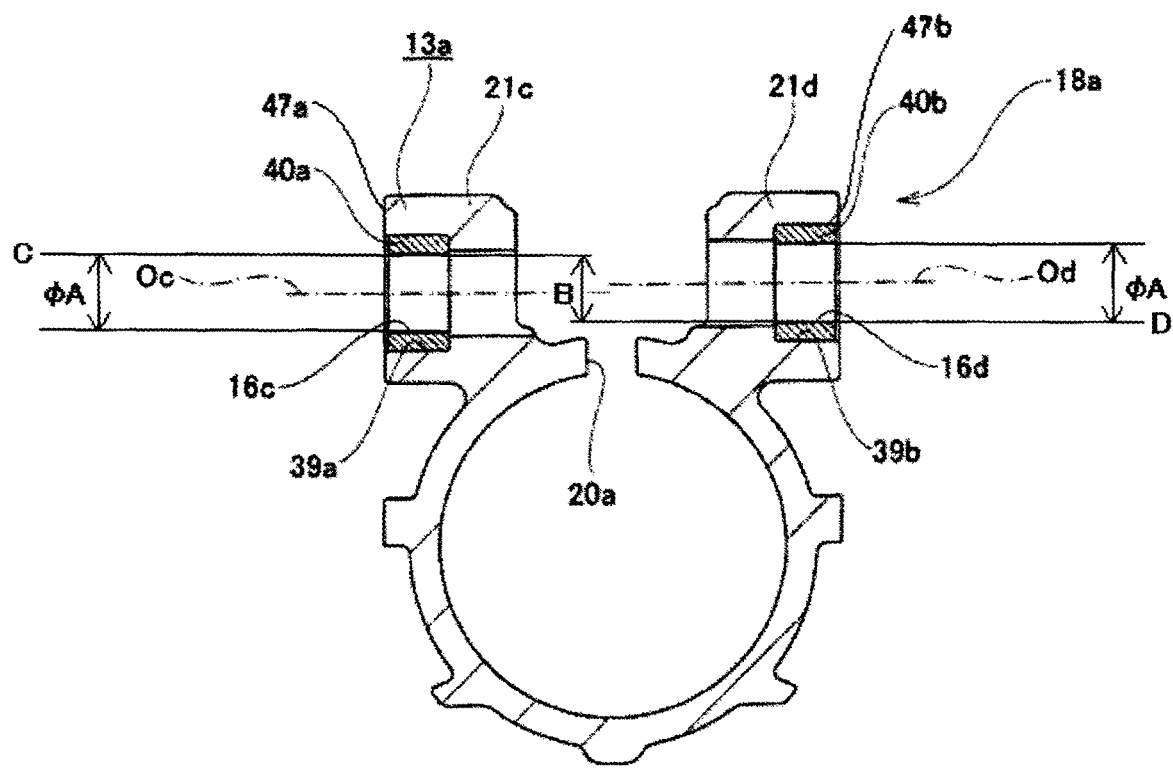
FIG. 2 is a sectional view depicting a state where an outer column is taken out and is cut along a virtual plane perpendicular to a central axis of the outer column.

In the first example, in the clamped state, in order to improve the support rigidity impression of the steering wheel 1 in the vertical direction, the relation of the vertical gaps between the upper surfaces and lower surfaces of the inner surfaces of both the long holes 16c, 16d for telescopic adjustment and the outer peripheral surface of the adjustment rod 17a is made to be different from the above-described conventional structure. To this end, in the first example, as shown in FIG. 2, a central axis Oc of one (the left in FIG. 2) long hole 16c for telescopic adjustment in the width direction, at which the adjustment lever 23a is arranged, of both the long holes 16c, 16d for telescopic adjustment is arranged to deviate more downward than a central axis Od of the other (the right, in FIG. 2) long hole 16d for telescopic adjustment in the width direction. Here, the central axis Oc extends perpendicularly to one surface 47a of the clamped plate part 21c in the width direction, and the central axis Od extends perpendicularly to the other surface 47b of the clamped plate part 21d in the width direction. In the meantime, one surface 47a of the clamped plate part 21c in the width direction and the other surface 47b of the clamped plate part 21d in the width direction extend in a direction perpendicular to the axial direction of the steering column 6 and perpendicular to the width direction of the vehicle body. That is, one surface 47a of the clamped plate part 21c in the width direction and the other surface 47b of the clamped plate part 21d in the width direction extend in the vertical direction.

Also, in the first example, both the long holes 16c, 16d for telescopic adjustment are not directly formed in both the clamped plate parts 21c, 21d. That is, annular sleeves 40a, 40b made of an elastic material are mounted inside outer half portions in the width direction of the telescopic lower holes 39a, 39b penetrating both the clamped plate parts 21c, 21d in the width direction, so that both the long holes 16c, 16d for telescopic adjustment are configured. That is, both the long holes 16c, 16d for telescopic adjustment are configured by inner surfaces of both the sleeves 40a, 40b. Accordingly, in the first example, one telescopic lower hole 39a in the width direction of both the telescopic lower holes 39a, 39b is formed to be lower than the other telescopic lower hole 39b in the width direction. Also, both the sleeves 40a, 40b are made of elastomer such as a rubber or a synthetic resin having excellent slidability such as polyamide resin (nylon), polyacetal resin, polytetrafluoroethylene resin (PTFE) and the like. Both the sleeves 40a, 40b are the same in terms of specifications of thickness dimension and the like.

FIG. 3 depicts an unclamped state where the width dimension of the cam device 28a is contracted and the force of clamping the clamped plate parts 21c, 21d by both the support plate parts 22c, 22d is released. In FIG. 2, a diameter of an inner surface of each of both the sleeves 40a, 40b is denoted with ϕA, a straight line passing through the top of the inner surface of one sleeve 40a in the width direction (the sleeve 40a positioned lower than the sleeve 40b) and extending in the direction perpendicular to one surface 47a in the width direction of one clamped plate part 21c in the width direction is denoted with C, a straight line passing through the bottom of the inner surface of the other sleeve 40b in the width direction (the sleeve 40b positioned higher than the sleeve 40a) and extending in the direction perpendicular to the other surface 47b in the width direction of the other clamped plate part 21d in the width direction is denoted with D, and a vertical width between the straight lines C and D is denoted with B. Here, the diameter φA is greater than the vertical width B (φA>B). Accordingly, in the unclamped state, due to a moment force based on a weight of the adjustment lever 23a supported to one end portion in the width direction, one end of the adjustment rod 17a in the width direction is tilted downward and the other end of the adjustment rod 17a in the width direction is tilted upward. For this reason, in the unclamped state, the lower surface of the inner surface of one long hole 16c for telescopic adjustment in the width direction and the outer peripheral surface of the adjustment rod 17a are contacted, and the upper surface of the inner surface of the other long hole 16d for telescopic adjustment in the width direction and the outer peripheral surface of the adjustment rod 17a are contacted. Also, in this state, a relatively large vertical gap 41a exists between the upper surface of the inner surface of one long hole 16c for telescopic adjustment in the width direction and the outer peripheral surface of the adjustment rod 17a, and a relatively large vertical gap 41b exists between the lower surface of the inner surface of the other long hole 16d for telescopic adjustment in the width direction and the outer peripheral surface of the adjustment rod 17a. In the first example, the adjustment rod 17a is tilted by the weight of the adjustment lever 23a. However, for example, the adjustment rod 17a may also be tilted using an elastic force of the guide member 42 arranged in the slit 20a.

In contrast, when the unclamped state as described above is switched to a clamped state, in which the width dimension of the cam device 28a is expanded and the clamped plate parts 21c, 21d are clamped by both the support plate parts 22c, 22d, on the basis of the rotation operation of the adjustment lever 23a, a state as shown in FIG. 4 is formed. That is, the adjustment rod 17a is caused to swing from the state shown in FIG. 3, and is fixed with being arranged in a direction (the horizontal direction) perpendicular to both the support plate parts 22c, 22d. In this clamped state, the upper surface of the inner surface of one long hole 16c for telescopic adjustment in the width direction and the outer peripheral surface of the adjustment rod 17a are contacted, and the lower surface of the inner surface of the other long hole 16d for telescopic adjustment in the width direction and the outer peripheral surface of the adjustment rod 17a are contacted. Also, in this state, a vertical gap 41c exists between the lower surface of the inner surface of one long hole 16c for telescopic adjustment in the width direction and the outer peripheral surface of the adjustment rod 17a, and a vertical gap 41d exists between the upper surface of the inner surface of the other long hole 16d for telescopic adjustment in the width direction and the outer peripheral surface of the adjustment rod 17a.

That is, in the first example, in the clamped state, the upper surface of the inner surface of one long hole 16c for telescopic adjustment in the width direction is contacted to the outer peripheral surface of the adjustment rod 17a (the vertical gap between the upper surface and the outer peripheral surface becomes zero). Also, the vertical gap 41c exists between the lower surface of the inner surface of one long hole 16c for telescopic adjustment in the width direction and the outer peripheral surface of the adjustment rod 17a. Also, the lower surface of the inner surface of the other long hole 16d for telescopic adjustment in the width direction is contacted to the outer peripheral surface of the adjustment rod 17a (the vertical gap between the lower surface and the outer peripheral surface becomes zero). The vertical gap 41d exists between the upper surface of the inner surface of the other long hole 16d for telescopic adjustment in the width direction and the outer peripheral surface of the adjustment rod 17a.

According to the steering device of the first example configured as described above, it is possible to improve the support rigidity impression of the steering wheel 1 in the vertical direction, thereby improving the driver's steering feel.

That is, in the first example, in the clamped state, the upper surface of the inner surface of one long hole 16c for telescopic adjustment in the width direction and the outer peripheral surface of the adjustment rod 17a are contacted, the lower surface of the inner surface of the other long hole 16d for telescopic adjustment in the width direction and the outer peripheral surface of the adjustment rod 17a are contacted, and the contact positions to the outer peripheral surface of the adjustment rod 17a are on opposite sides with respect to the vertical direction in one long hole 16c for telescopic adjustment in the width direction and the other long hole 16d for telescopic adjustment in the width direction. For this reason, as compared to the above-described conventional structure where the magnitude relation of the vertical gaps from the outer peripheral surface of the adjustment rod to the upper surface and lower surface of the inner surface is the same in one through-hole in the width direction and the other through-hole in the width direction, it is possible to suppress a distance (an amount of displacement) within which the steering column 18a can be substantially displaced relative to the adjustment rod 17a in the vertical direction. Accordingly, it is possible to improve the support rigidity impression of the steering wheel 1 in the vertical direction, thereby improving the driver's steering feel.

Also, in the first example, in the unclamped state, one long hole 16c for telescopic adjustment in the width direction is contacted only at the lower surface to the outer peripheral surface of the adjustment rod 17a, and the other long hole 16d for telescopic adjustment in the width direction is contacted only at the upper surface to the outer peripheral surface of the adjustment rod 17a. For this reason, it is possible to form the relatively large vertical gap 41a between the upper surface of the inner surface of one long hole 16c for telescopic adjustment in the width direction and the outer peripheral surface of the adjustment rod 17a, and to form the relatively large vertical gap 41b between the lower surface of the inner surface of the other long hole 16d for telescopic adjustment in the width direction and the outer peripheral surface of the adjustment rod 17a. Accordingly, as described above, it is possible to suppress the substantial displacement of the outer column 18a relative to the adjustment rod 17a in the vertical direction in the clamped state, but it is possible to smoothly move the outer column 18a relative to the adjustment rod 17a in the front and rear direction in the unclamped state. As a result, it is possible to favorably perform the position adjusting operation of the steering wheel 1 in the front and rear direction.

Also, in the first example, when a secondary collision occurs and the forward and upward force is thus applied to the outer column 18a, a part close to the other end of the adjustment rod 17a in the width direction is pressed by the lower surface of the inner surface of the other long hole 16d for telescopic adjustment in the width direction of both the long holes 16c, 16d for telescopic adjustment. As a result, since the adjustment rod 17a tends to be tilted (the distance between the non-drive-side cam 27a and the pressing plate 38 in the width direction tends to be narrowed), it is possible to strongly press both the support plate parts 22c, 22d from both sides in the width direction by both the members 27a, 28. Accordingly, it is possible to increase the force of holding the displacement bracket 13a by the support bracket 14a. As a result, when the secondary collision occurs, it is possible to easily separate the support bracket 14a forward from the vehicle body, so that it is possible to sufficiently protect the driver.

Second Example of Embodiment

Figure 5:
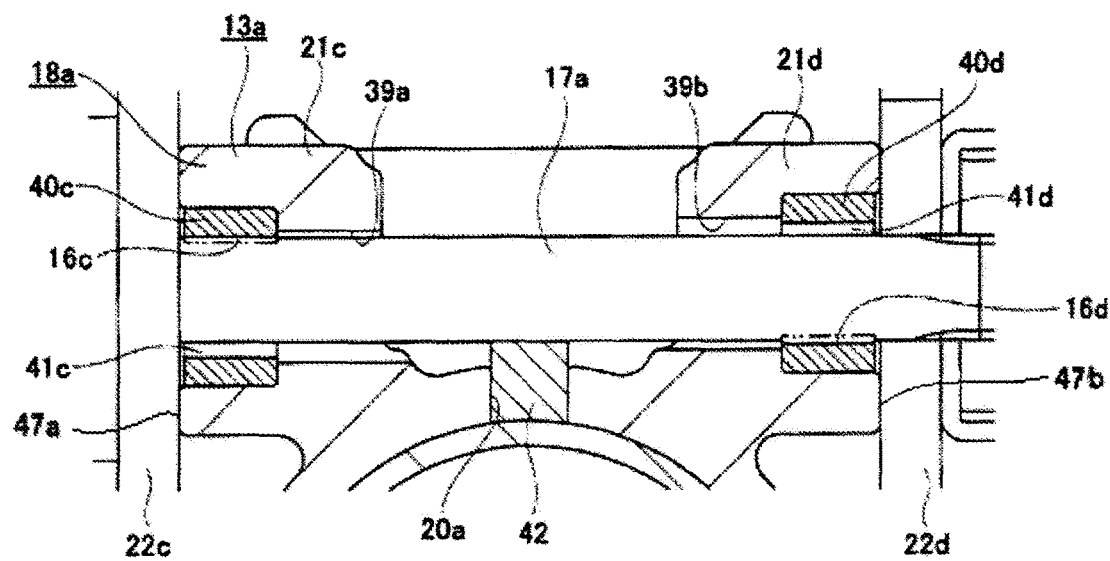
FIG. 5 is a view equivalent to FIG. 4B, depicting a second example of the embodiment.

A second example of the embodiment is described with reference to FIG. 5. A feature of the second example is that in the clamped state, the upper surface of the inner surface of one (the left in FIG. 5) long hole 16c for telescopic adjustment in the width direction and the lower surface of the inner surface of the other (the right in FIG. 5) long hole 16d for telescopic adjustment are contacted to the outer peripheral surface of the adjustment rod 17a with an interference, respectively. That is, in the second example, when the adjustment rod 17a is caused to swing in association with the switching from the unclamped state to the clamped state, the upper surface of the inner surface of the sleeve 40c configuring the long hole 16c for telescopic adjustment and the lower surface of the inner surface of the sleeve 40d configuring the long hole 16d for telescopic adjustment are respectively pressed by the outer peripheral surface of the adjustment rod 17a, so that both the sleeves 40c, 40d are elastically deformed.

In the second example configured as described above, as compared to the first example of the embodiment, it is possible to make it difficult for the outer column 18a to be displaced relative to the adjustment rod 17a in the vertical direction. Accordingly, it is possible to further improve the rigidity impression of the steering wheel 1 in the vertical direction.

The other configurations and operational effects are similar to the first example of the embodiment.

Third Example of Embodiment

Figure 6:
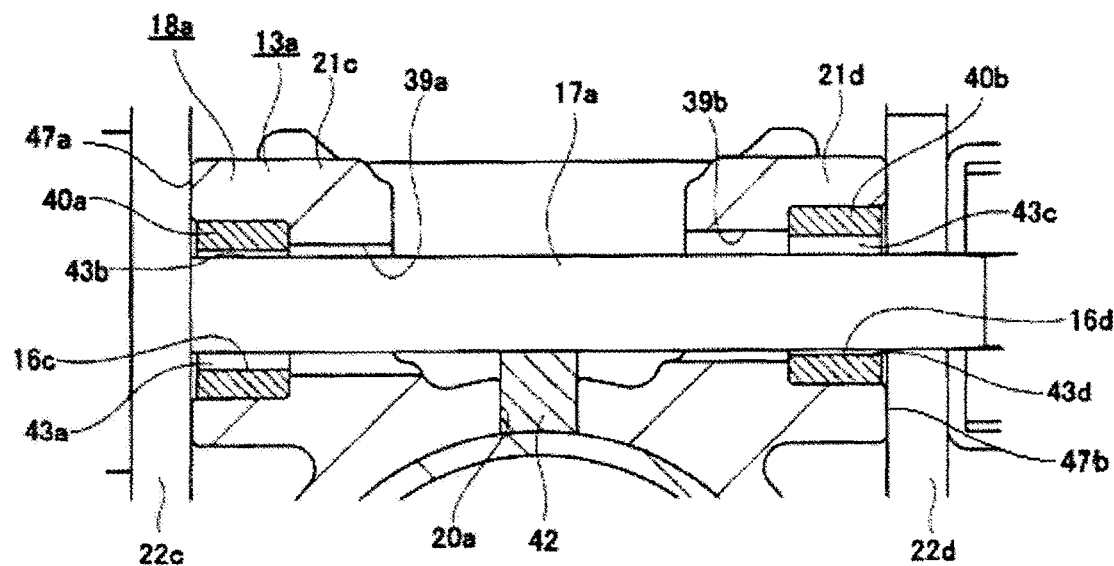
FIG. 6 is a view equivalent to FIG. 4B, depicting a third example of the embodiment.

A third example of the embodiment is described with reference to FIG. 6. A feature of the third example is that in the clamped state, vertical gaps are respectively provided between the upper surfaces and lower surfaces of the inner surfaces of the long holes 16c, 16d for telescopic adjustment and the outer peripheral surface of the adjustment rod 17a.

That is, in the third example, when the adjustment rod 17a is caused to swing in association with the switching from the unclamped state to the clamped state, a relatively large vertical gap 43a is provided between the lower surface of the inner surface of one (the left in FIG. 6) long hole 16c for telescopic adjustment in the width direction and the outer peripheral surface of the adjustment rod 17a, and a relatively large vertical gap 43b having a vertical dimension smaller than the vertical gap 43a is provided between the upper surface and the outer peripheral surface of the adjustment rod 17a. Also, a relatively large vertical gap 43c is provided between the upper surface of the inner surface of the other (the right in FIG. 6) long hole 16d for telescopic adjustment in the width direction and the outer peripheral surface of the adjustment rod 17a, and a relatively large vertical gap 43d having a vertical dimension smaller than the vertical gap 43c is provided between the lower surface and the outer peripheral surface of the adjustment rod 17a.

In the third example configured as described above, as compared to the first example of the embodiment, although the displaceable distance of the outer column 18a relative to the adjustment rod 17a in the vertical direction increases, it is possible to sufficiently suppress the distance, as compared to the above-described conventional structure. Also, in the unclamped state, it is possible to more smoothly move the outer column 18a in the front and rear direction.

The other configurations and operational effects are similar to the first example of the embodiment.

Fourth Example of Embodiment

Figure 7:
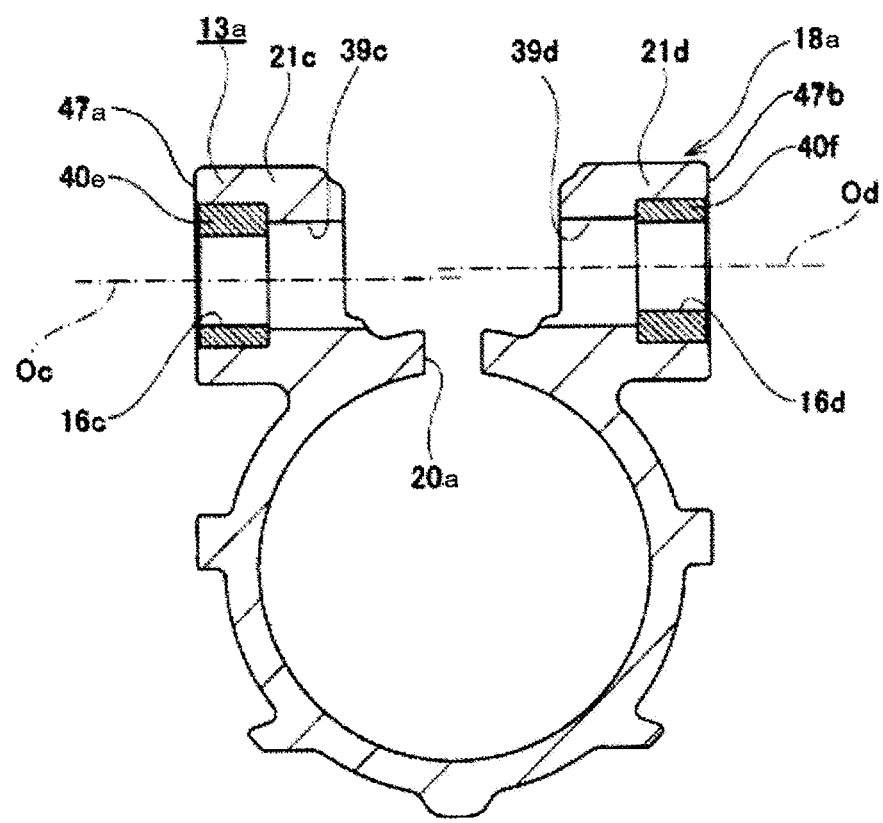
FIG. 7 is a view equivalent to FIG. 2, depicting a fourth example of the embodiment.

A fourth example of the embodiment is described with reference to FIG. 7. A feature of the fourth example is that the central axes Oc, Od of the pair of long holes 16c, 16d for telescopic adjustment are made to deviate from each other by a configuration different from the first example of the embodiment.

That is, in the fourth example, a central axis of the telescopic lower hole 39c formed in one clamped plate part 21c in the width direction and a central axis of the telescopic lower hole 39d formed in the other clamped plate part 21d in the width direction are made to coincide with each other with being arranged in the horizontal direction without deviating the same the vertical direction. In contrast, a sleeve 40e to be mounted in one telescopic lower hole 39c in the width direction and a sleeve 40f to be mounted in the other telescopic lower hole 39d in the width direction are made to be different in terms of thickness dimensions of an upper end portion and a lower end portion. Specifically, the thickness dimension (radial thickness) of the upper end portion is made greater for the sleeve 40e arranged at one side in the width direction than for the sleeve 40f arranged at the other side in the width direction, and the thickness dimension of the lower end portion is made smaller for the sleeve 40e arranged at one side in the width direction than for the sleeve 40f arranged at the other side in the width direction. Meanwhile, in the fourth example, in order to secure the above dimension relation, as both the sleeves 40e, 40f, sleeves of which an inner peripheral surface is eccentric relative to an outer peripheral surface are used, and both the sleeves 40e, 40f are mounted at a state (an inverted state in the vertical direction) where phases thereof are shifted by 180° with respect to both the telescopic lower holes 39c, 39d.

In the fourth example configured as described above, since it is possible to form one telescopic lower hole 39c in the width direction and the other telescopic lower hole 39d in the width direction on the same axis, it is possible to reduce the processing cost, as compared to the first example of the embodiment.

The other configurations and operational effects are similar to the first example of the embodiment.

Fifth Example of Embodiment

A fifth example of the embodiment is described with reference to FIGS. 8 and 9. A feature of the fifth example is that in the unclamped state, the adjustment rod 17a is tilted in the opposite direction to the first example of the embodiment.

That is, in the fifth example, a central axis Of of the other (the right in FIG. 8) long hole 16f for telescopic adjustment in the width direction of a pair of long holes 16e, 16f for telescopic adjustment is arranged to deviate more downward than a central axis Oe of one (the left, in FIG. 8) long hole 16e for telescopic adjustment in the width direction. To this end, in the fifth example, the other telescopic lower hole 39f in the width direction is formed lower than one telescopic lower hole 39e in the width direction. The annular sleeves 40a, 40b made of an elastic material are mounted in the telescopic lower holes 39e, 39f, so that both the long holes 16e, 16f for telescopic adjustment are configured.

In the fifth example configured as described above, in the unclamped state, as shown in FIG. 8, one end of the adjustment rod 17a in the width direction is tilted upward and the other end of the adjustment rod 17a in the width direction is tilted downward. For this reason, in the unclamped state, the upper surface of the inner surface of one long hole 16e for telescopic adjustment in the width direction and the outer peripheral surface of the adjustment rod 17a are contacted, and the lower surface of the inner surface of the other long hole 16f for telescopic adjustment in the width direction and the outer peripheral surface of the adjustment rod 17a are contacted. Also, in this state, a relatively large vertical gap 44a exists between the lower surface of the inner surface of one long hole 16e for telescopic adjustment in the width direction and the outer peripheral surface of the adjustment rod 17a, and a relatively large vertical gap 44b exists between the upper surface of the inner surface of the other long hole 16f for telescopic adjustment in the width direction and the outer peripheral surface of the adjustment rod 17a.

Figure 8A:
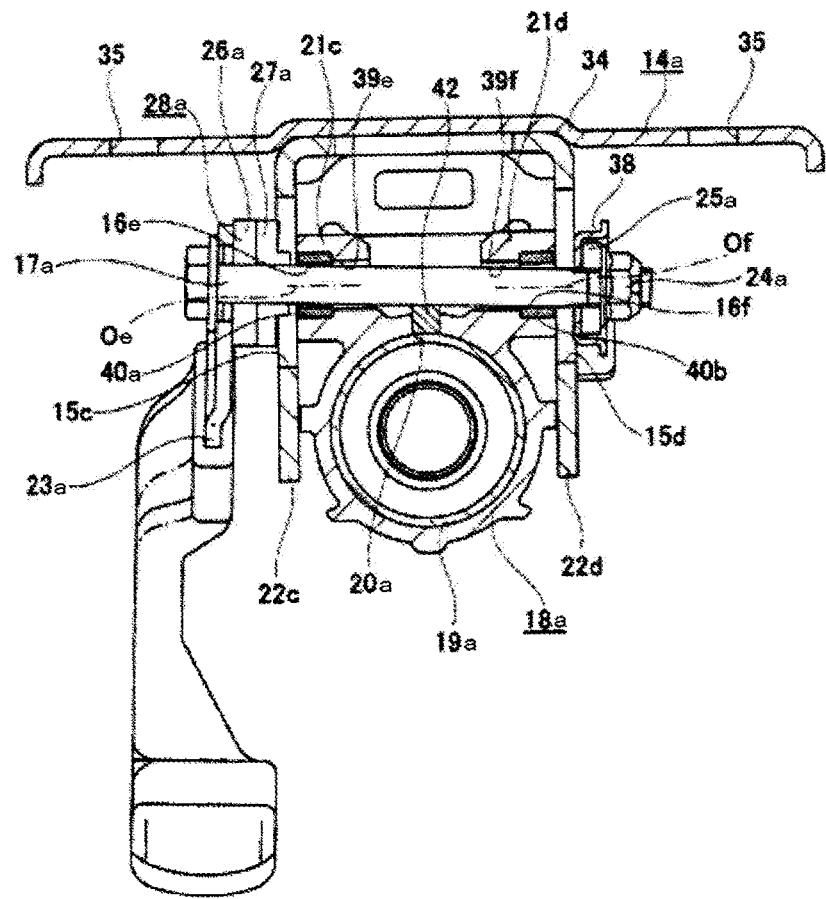
FIG. 8A is a view equivalent to the A-A section of FIG. 1 in the unclamped state, depicting a fifth example of the embodiment.
Figure 8B:
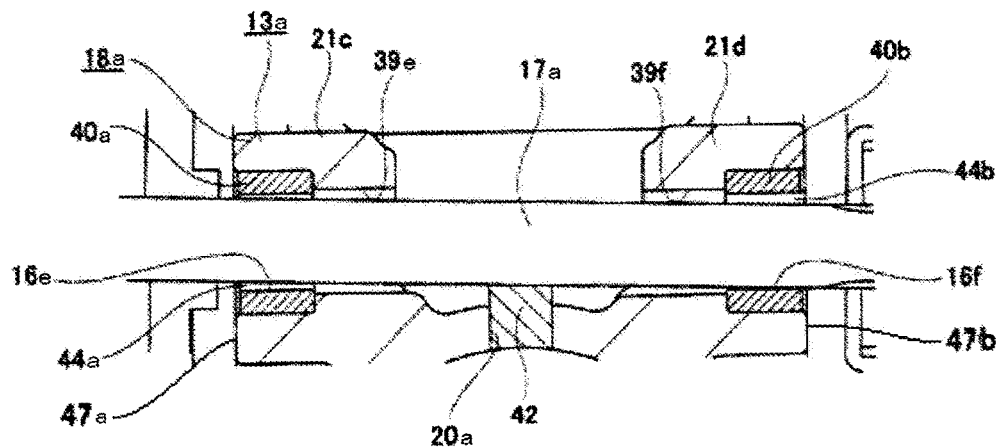
FIG. 8B is a partially enlarged view of FIG. 8A.
Figure 9A:
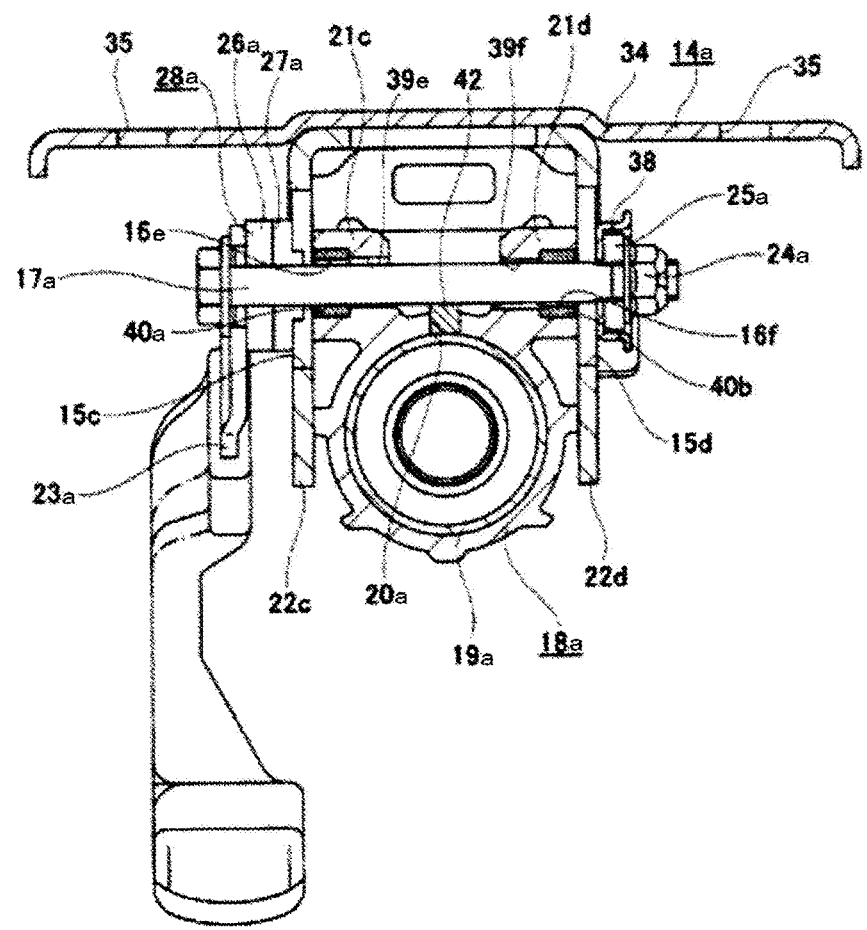
FIG. 9A is a view equivalent to the A-A section of FIG. 1 in the clamped state, depicting the fifth example of the embodiment.
Figure 9B:
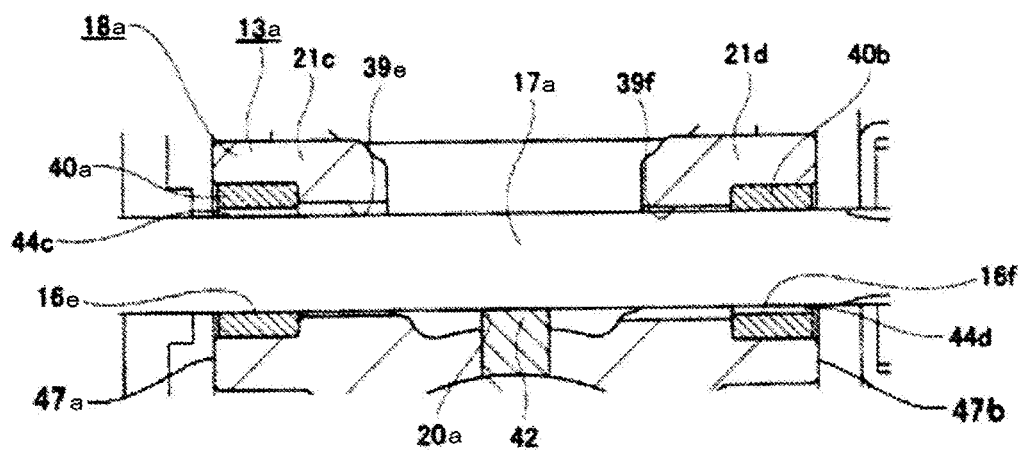
FIG. 9B is a partially enlarged view of FIG. 9A.

In contrast, when the unclamped state is switched to the clamped state, the adjustment rod 17a is caused to swing from the state shown in FIG. 8, and is fixed with being arranged in the direction (the horizontal direction) perpendicular to both the support plate parts 22c, 22d. In this clamped state, the lower surface of the inner surface of one long hole 16e for telescopic adjustment in the width direction and the outer peripheral surface of the adjustment rod 17a are contacted, and the upper surface of the inner surface of the other long hole 16f for telescopic adjustment in the width direction and the outer peripheral surface of the adjustment rod 17a are contacted. Also, in this state, a vertical gap 44c exists between the upper surface of the inner surface of one long hole 16e for telescopic adjustment in the width direction and the outer peripheral surface of the adjustment rod 17a, and a vertical gap 44d exists between the lower surface of the inner surface of the other long hole 16f for telescopic adjustment in the width direction and the outer peripheral surface of the adjustment rod 17a.

The other configurations and operational effects are similar to the first example of the embodiment.

Sixth Example of Embodiment

Figure 10:
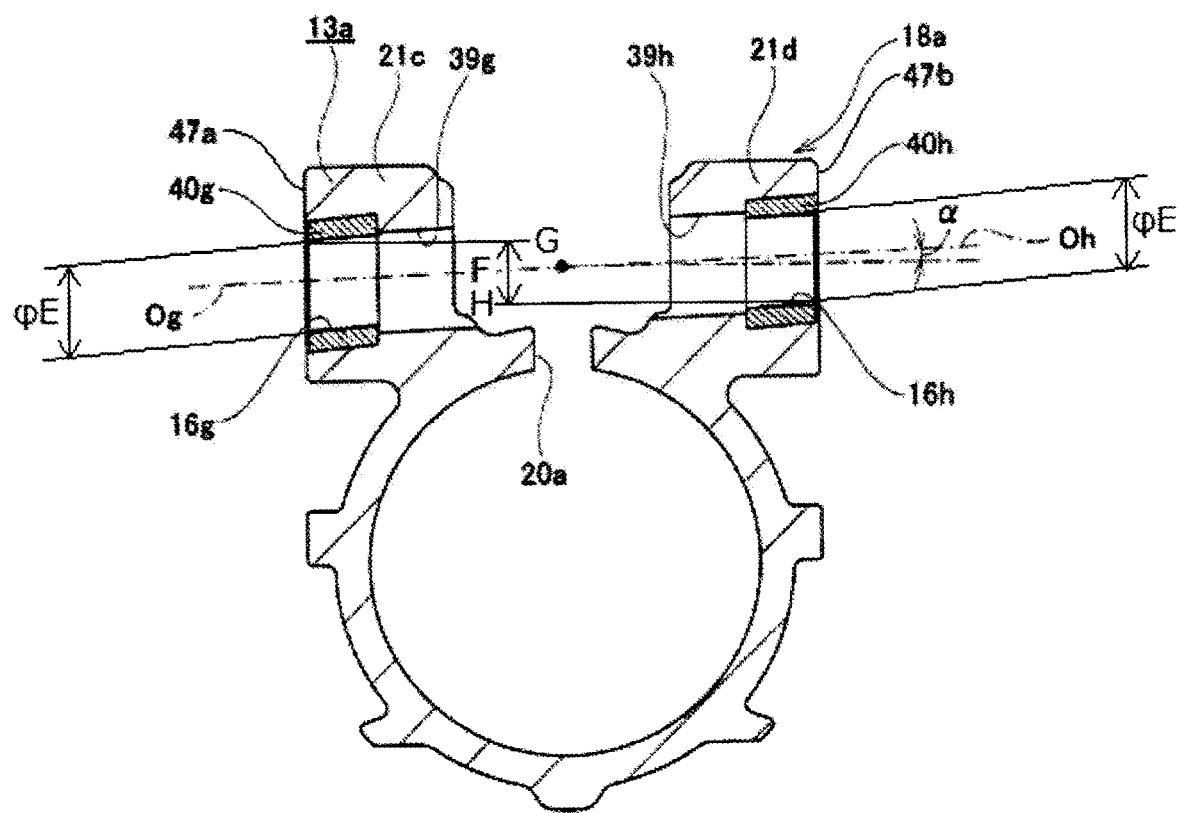
FIG. 10 is a view equivalent to FIG. 2, depicting a sixth example of the embodiment.

A sixth example of the embodiment is described with reference to FIG. 10. A feature of the sixth example is that the relation of the vertical gaps between the upper surfaces and lower surfaces of the inner surfaces of a pair of long holes 16g, 16h for telescopic adjustment and the outer peripheral surface of the adjustment rod 17a (refer to FIGS. 3 and 4, and the like) are made to be different from the above-described conventional structure, without causing central axes Og, Oh of both the long holes 16g, 16h for telescopic adjustment to deviate from each other in the vertical direction.

That is, in the sixth example, the central axis Og of one long hole 16g for telescopic adjustment in the width direction of both the long holes 16g, 16h for telescopic adjustment and the central axis Oh of the other long hole 16h for telescopic adjustment in the width direction are made to coincide with each other, and are inclined by an angle of a in the vertical direction with respect to the horizontal direction. To this end, one telescopic lower hole 39g in the width direction and the other telescopic lower hole 39h in the width direction are formed on the same axis with being inclined by the angle of a with respect to the horizontal direction. The telescopic lower holes 39g, 39h are mounted therein with annular sleeves 40g, 40h made of an elastic material, so that both the long holes 16g, 16h for telescopic adjustment are configured. In FIG. 10, diameters of inner surfaces of the sleeves 40g, 40h at both sides in the width direction are denoted with φE, a straight line passing through the top of one end portion in the width direction of the inner surface of one sleeve 40g in the width direction and extending in the direction perpendicular to one surface 47a in the width direction of one clamped plate part 21c in the width direction is denoted with G, a straight line passing through the bottom of the other end portion in the width direction of the inner surface of the other sleeve 40h in the width direction and extending in the direction perpendicular to the other surface 47b in the width direction of the other clamped plate part 21d in the width direction is denoted with H, and a vertical width between the straight lines G and H is denoted with F. Here, the diameter φE is greater than the vertical width F (E>F).

In the sixth example configured as described above, in the unclamped state, due to the moment force based on the weight of the adjustment lever 23a (refer to FIGS. 3 and 4, and the like) supported to one end portion of the adjustment rod 17a in the width direction, one end of the adjustment rod 17a in the width direction is tilted downward and the other end of the adjustment rod 17a in the width direction is tilted upward. For this reason, in the unclamped state, the lower surface of the inner surface of one long hole 16g for telescopic adjustment in the width direction and the outer peripheral surface of the adjustment rod 17a are contacted, and the upper surface of the inner surface of the other long hole 16h for telescopic adjustment in the width direction and the outer peripheral surface of the adjustment rod 17a are contacted. Also, in this state, a relatively large vertical gap exists between the upper surface of the inner surface of one long hole 16g for telescopic adjustment in the width direction and the outer peripheral surface of the adjustment rod 17a, and a relatively large vertical gap exists between the lower surface of the inner surface of the other long hole 16h for telescopic adjustment in the width direction and the outer peripheral surface of the adjustment rod 17a.

In contrast, when the unclamped state is switched to the clamped state, the adjustment rod 17a is fixed with being arranged in the direction perpendicular to the support plate parts 22c, 22d (refer to FIGS. 3 and 4, and the like). In this clamped state, the upper surface of the inner surface of one long hole 16g for telescopic adjustment in the width direction and the outer peripheral surface of the adjustment rod 17a are contacted, and the lower surface of the inner surface of the other long hole 16h for telescopic adjustment in the width direction and the outer peripheral surface of the adjustment rod 17a are contacted. Also, in this state, a vertical gap exists between the lower surface of the inner surface of one long hole 16g for telescopic adjustment in the width direction and the outer peripheral surface of the adjustment rod 17a, and a vertical gap exists between the upper surface of the inner surface of the other long hole 16h for telescopic adjustment in the width direction and the outer peripheral surface of the adjustment rod 17a.

In the sixth example configured as described above, since both the telescopic lower holes 39g, 39h are formed on the same axis, it is possible to suppress the processing cost of both the telescopic lower hole 39g, 39h, as compared to the first example of the embodiment.

The other configurations and operational effects are similar to the first example of the embodiment.

Seventh Example of Embodiment

Figure 11A:
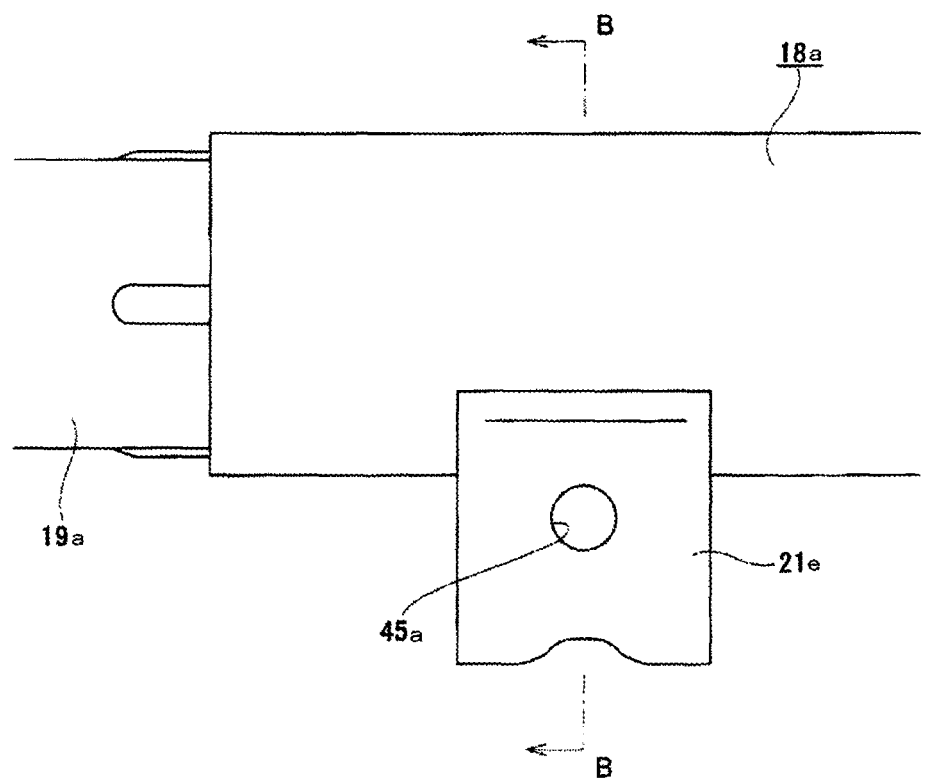
FIG. 11A is a partial side view of a steering column, depicting a seventh example of the embodiment.
Figure 11B:
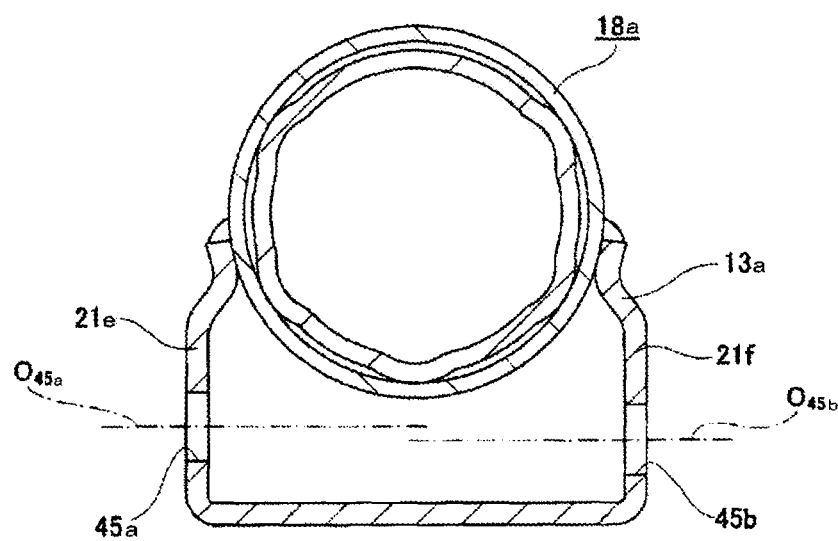
FIG. 11B is a sectional view taken along a line B-B of FIG. 11A.

A seventh example of the embodiment is described with reference to FIG. 11. A feature of the seventh example is that only the tilt mechanism for adjusting the vertical position is provided without the telescopic mechanism for adjusting the position of the steering wheel 1 (refer to FIG. 15) in the front and rear direction.

For this reason, in the seventh example, a pair of clamped plate parts 21e, 21f provided below the part close to the front end of the outer column 18a is formed with simple circular holes 45a, 45b penetrating the same in the width direction. Also, a central axis $O_{45a}$ of one circular hole 45a in the width direction is arranged to deviate more upward than a central axis $O_{45b}$ of the other circular hole 45b in the width direction.

Also in the seventh example configured as described above, like the first example of the embodiment, in the clamped state, it is possible to suppress the distance within which the outer column 18a can be substantially displaced in the vertical direction relative to the adjustment rod 17a (refer to FIGS. 3 and 4, and the like) inserted in both the circular holes 45a, 45b in the width direction.

The other configurations and operational effects are similar to the first example of the embodiment.

Eighth Example of Embodiment

An eighth example of the embodiment is described with reference to FIGS. 12 to 14. In the eighth example, a pair of support plate parts 22e, 22f configuring a support bracket 14b is made to have different bending rigidity in the width direction. That is, a plate thickness of one support plate part 22e in the width direction is made greater than a plate thickness of the other support plate part 22f in the width direction, so that the bending rigidity of one support plate part 22e in the width direction is made higher than the bending rigidity of the other support plate part 22f in the width direction. Also, a central axis Oi of one long hole 16i for telescopic adjustment in the width direction, in which the support plate part 22e having higher bending rigidity is arranged, of a pair of long holes 16i, 16j for telescopic adjustment is arranged to deviate more downward toward the central axis of the outer column 18a than a central axis Oj of the other long hole 16j for telescopic adjustment in the width direction. In the eighth example, the lower surface of the outer peripheral surface of the adjustment rod 17a is elastically pressed upward by a guide member 42a made of an elastic material and provided in the slit 20a of the outer column 18a.

In the eighth example configured as described above, the adjustment rod 17a is pushed upward by the pressing force of the guide member 42a. For this reason, in the unclamped state shown in FIG. 12, the upper surface of the inner surface of one long hole 16i for telescopic adjustment in the width direction and the outer peripheral surface of the adjustment rod 17a are contacted, and the upper surface of the inner surface of the other long hole 16j for telescopic adjustment in the width direction and the outer peripheral surface of the adjustment rod 17a are contacted. Also, in this state, a relatively large vertical gap 46a exists between the lower surface of the inner surface of one long hole 16i for telescopic adjustment in the width direction and the outer peripheral surface of the adjustment rod 17a, and a relatively large vertical gap 46b exists between the lower surface of the inner surface of the other long hole 16j for telescopic adjustment in the width direction and the outer peripheral surface of the adjustment rod 17a.

Figure 12A:
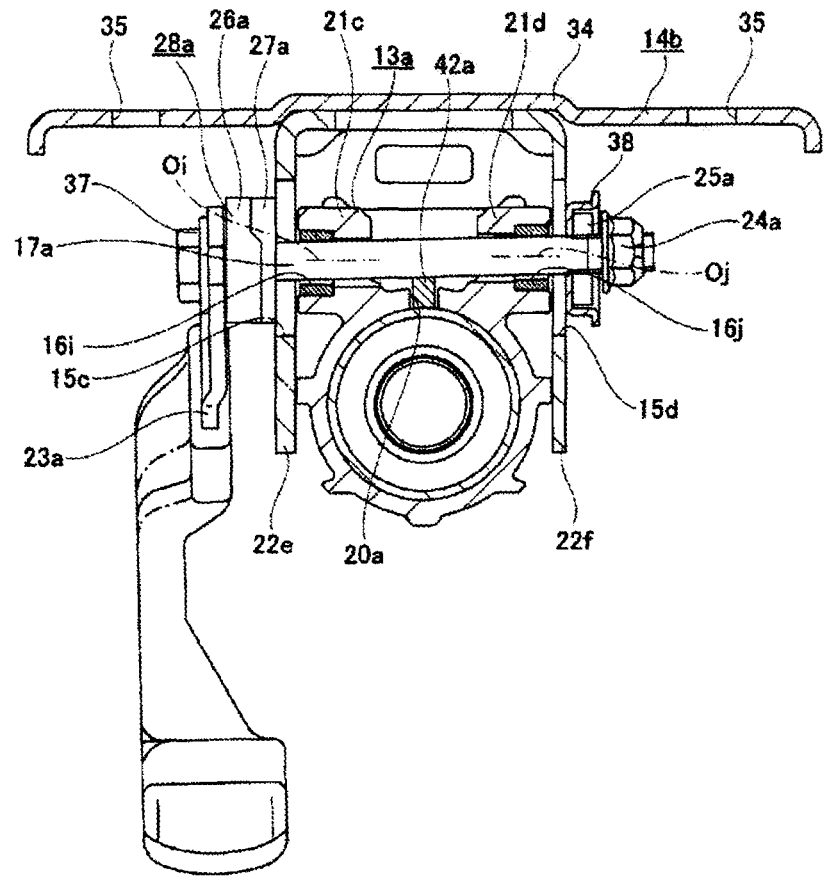
FIG. 12A is a view equivalent to the A-A section of FIG. 1 in the unclamped state, depicting an eighth example of the embodiment.
Figure 12B:
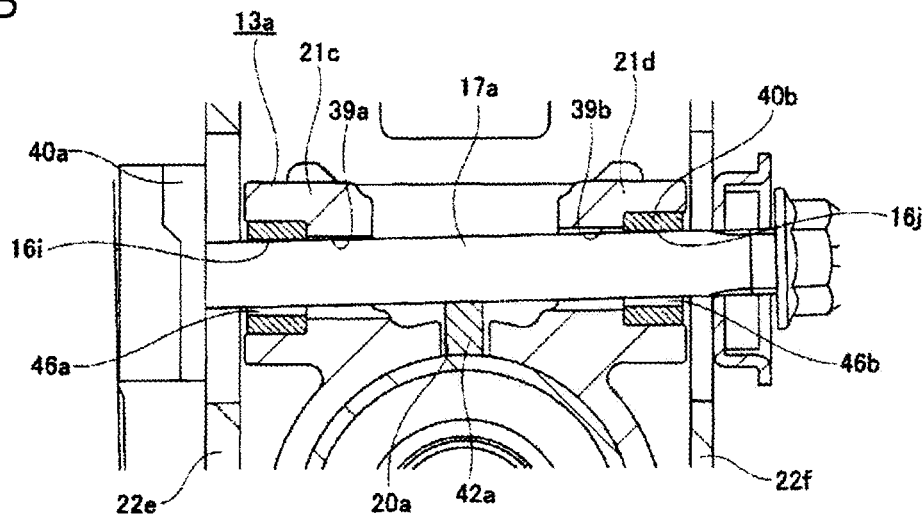
FIG. 12B is a partially enlarged view of FIG. 12A.
Figure 13A:
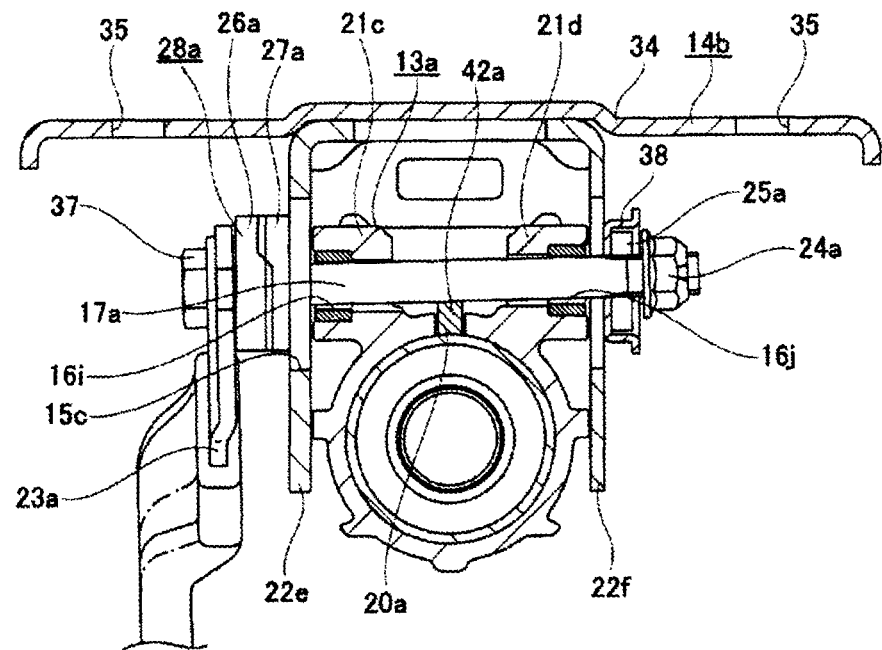
FIG. 13A is a view equivalent to the A-A section of FIG. 1, depicting a switching state from the unclamped state to the clamped state.
Figure 13B:
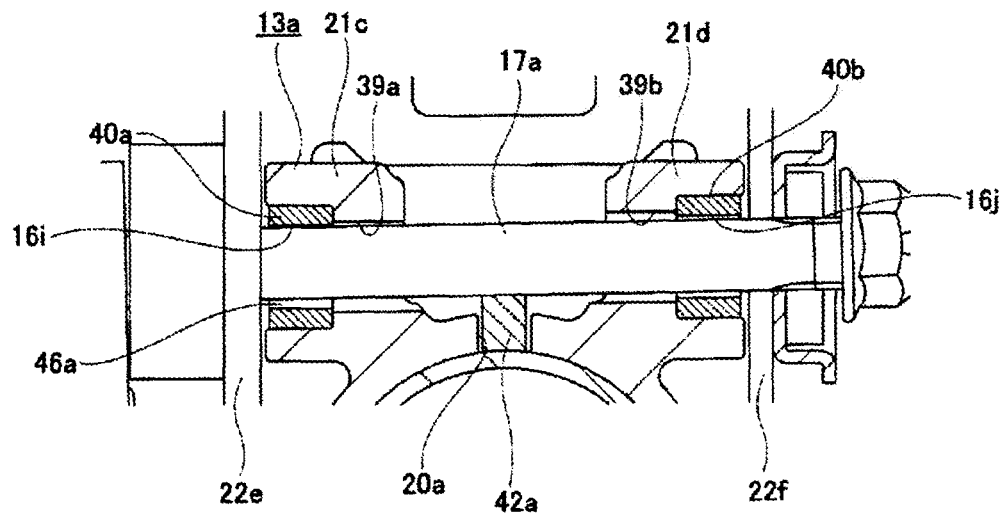
FIG. 13B is a partially enlarged view of FIG. 13A.
Figure 14A:
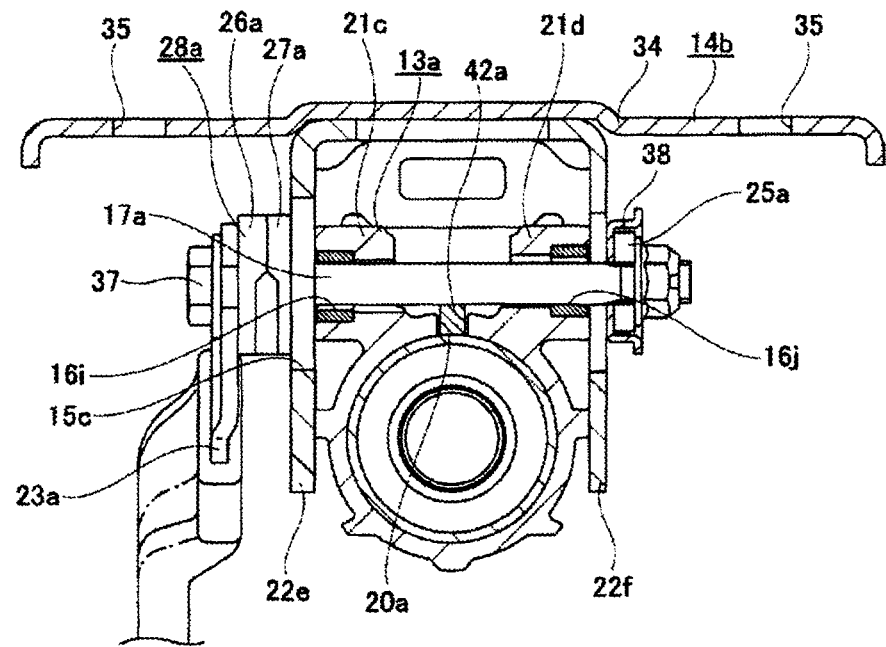
FIG. 14A is a view equivalent to the A-A section of FIG. 1 in the clamped state, depicting the eighth example of the embodiment.
Figure 14B:
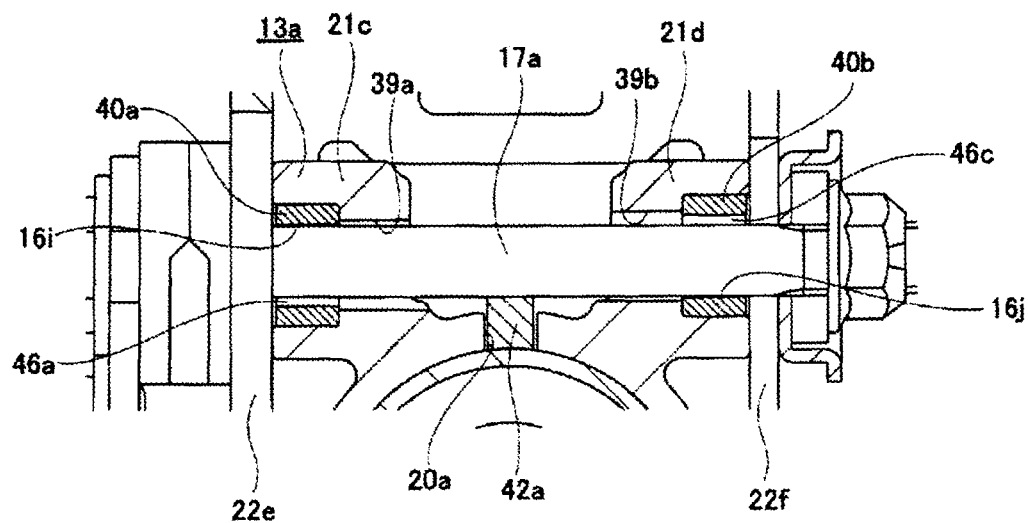
FIG. 14B is a partially enlarged view of FIG. 14A.

In contrast, when the unclamped state as described above is switched to the clamped state, the adjustment rod 17a is caused to swing in the horizontal direction about one part in the width direction at which the support plate part 22e having higher bending rigidity is arranged, in order of FIG. 12→FIG. 13→FIG. 14. Then, in the clamped state as shown in FIG. 14, the lower surface of the inner surface of the other long hole 16j for telescopic adjustment in the width direction is contacted to the outer peripheral surface of the adjustment rod 17a with the upper surface of the inner surface of one long hole 16i for telescopic adjustment in the width direction being in contact with the outer peripheral surface of the adjustment rod 17a. Also, in this state, the vertical gap 46a exists between the lower surface of the inner surface of one long hole 16i for telescopic adjustment in the width direction and the outer peripheral surface of the adjustment rod 17a, and a vertical gap 46c exists between the upper surface of the inner surface of the other long hole 16j for telescopic adjustment in the width direction and the outer peripheral surface of the adjustment rod 17a.

In the eighth example configured as described above, when the unclamped state is switched to the clamped state, the adjustment rod 17a can be caused to swing in the horizontal direction about one part in the width direction at which the support plate part 22e having higher bending rigidity is arranged. Accordingly, one end portion in the width direction of the outer peripheral surface of the adjustment rod 17a can be kept to be in contact with the upper surface of the inner surface of one long hole 16i for telescopic adjustment in the width direction. For this reason, upon the switching to the clamped state, it is possible to prevent the outer peripheral surface of the adjustment rod 17a from strongly contacting the inner surface of the long hole 16i for telescopic adjustment (the inner surface of the sleeve 40a).

The other configurations and operational effects are similar to the first example of the embodiment.

The subject application is based on Japanese Patent Application No. 2015-236862 filed on Dec. 3, 2015, the entire contents of which are incorporated herein by reference.

INDUSTRIAL APPLICABILITY

When implementing the present invention, the deviation amounts and deviation directions of the pair of through-holes (the long holes for telescopic adjustment) with respect to the vertical direction and the inclination angle (the sixth example of the embodiment) of the central axis relative to the horizontal direction are implemented without being limited to the respective examples of the embodiment. Also, the respective examples of the embodiment can be implemented with being appropriately combined.

DESCRIPTION OF REFERENCE NUMERALS

1: steering wheel
2: steering gear unit

3: input shaft
4: tie-rod
5, 5a: steering shaft
6, 6a: steering column
7: universal joint
8: intermediate shaft
9: universal joint
10, 10a: housing
11: vehicle body
12: tilt shaft
13: displacement bracket
14, 14a, 14b: support bracket
15a, 15b: long hole for tilt adjustment
16a to 16j: long hole for telescopic adjustment
17, 17a: adjustment rod
18, 18a: outer column
19, 19a: inner column
20, 20a: slit
21a to 21f: clamped plate part
22a to 22f: support plate part
23, 23a: adjustment lever
24, 24a: nut
25, 25a: thrust bearing
26, 26a: drive-side cam
27, 27a: non-drive-side cam
28, 28a: cam device
29a to 29d: vertical gap
30: electric motor
31: support pipe
32: inner shaft
33: outer shaft
34: attachment plate part
35: notch
36: engagement capsule
37: head
38: pressing plate
39a to 39f: telescopic lower hole
40a to 40f: sleeve
41a, 41b: vertical gap
42, 42a: guide member
43a to 43d: vertical gap
44a to 44d: vertical gap
45a, 45b: circular hole
46a to 46c: vertical gap
47a: one surface in the width direction
47b: the other surface in the width direction

The invention claimed is:

1. A vertical position adjustment device for steering wheel comprising:
    a pair of clamped plate parts provided at parts of a steering column with being spaced from each other in a width direction;
    a pair of through-holes formed to penetrate both the clamped plate parts in the width direction;
    a pair of support plate parts provided at parts of a support bracket supported to a vehicle body with clamping both the clamped plate parts from both sides in the width direction;
    a pair of long holes for tilt adjustment which are respectively long in a vertical direction, and are formed to penetrate both the support plate parts in the width direction;
    an adjustment rod provided to be inserted in both the through-holes and both the long holes for tilt adjustment in the width direction;
    a pair of pressing parts provided at portions of the adjustment rod which protrude from outer surfaces of the support plate parts, respectively, and
    an expansion/contraction mechanism configured to expand and reduce an interval between both the pressing parts, wherein
    in a clamped state where the interval between both the pressing parts is reduced and both the clamped plate parts are clamped by both the support plate parts, vertical distances from an outer peripheral surface of the adjustment rod to an upper surface and a lower surface of an inner surface of one through-hole of both the through-holes are different, vertical distances from the outer peripheral surface of the adjustment rod to an upper surface and a lower surface of an inner surface of the other through-hole of both the through-holes are different, and sides, where the vertical distance from the outer peripheral surface of the adjustment rod to the inner surface is smaller, are on opposite sides with respect to the vertical direction in one through-hole and the other through-hole.

2. The vertical position adjustment device for steering wheel according to claim 1, wherein
    in an unclamped state where the interval between both the pressing parts is expanded and a force of clamping both the clamped plate parts by both the support plate parts is released, the inner surface of one through-hole of both the through-holes and the inner surface of the other through-hole are contacted to the outer peripheral surface of the adjustment rod at only one side in the vertical direction, respectively.

3. The vertical position adjustment device for steering wheel according to claim 1, wherein
    a central axis of one through-hole and a central axis of the other through-hole deviate from each other in the vertical direction.

4. The vertical position adjustment device for steering wheel according to claim 1, wherein
    each of the through-holes is configured by an inner surface of an annular sleeve, which is made of an elastic material and to be mounted in a lower hole formed to each of the clamped plate parts.

5. The vertical position adjustment device for steering wheel according to claim 4, wherein
    a central axis of one lower hole formed to one clamped plate part of both the clamped plate parts and a central axis of the other lower hole formed to the other clamped plate part deviate from each other in the vertical direction.

6. The vertical position adjustment device for steering wheel according to claim 4, wherein
    a central axis of one lower hole formed to one clamped plate part of both the clamped plate parts and a central axis of the other lower hole formed to the other clamped plate part coincide with each other, and
    a central axis of one through-hole configured by the inner surface of one sleeve to be mounted in one lower hole and a central axis of the other through-hole configured by the inner surface of the other sleeve to be mounted in the other lower hole deviate from each other in the vertical direction.

7. The vertical position adjustment device for steering wheel according to claim 4, wherein
    in the clamped state, the inner surface of any one of both the through-holes and the outer peripheral surface of the adjustment rod are contacted with an interference in the vertical direction.

8. The vertical position adjustment device for steering wheel according claim 1, wherein
in the clamped state, vertical gaps having different sizes are respectively provided between both the upper and lower surfaces of the inner surface of one through-hole and the outer peripheral surface of the adjustment rod, and vertical gaps having different sizes are respectively provided between both the upper and lower surfaces of the inner surface of the other through-hole and the outer peripheral surface of the adjustment rod.

9. The vertical position adjustment device for steering wheel according claim 3, wherein
bending rigidity of one support plate part of both the support plate parts is higher than bending rigidity of the other support plate part,
the central axis of the through-hole, which is arranged at one support plate part-side in the width direction, of both the through-holes is arranged to be closer to the steering column in the vertical direction than the central axis of the other through-hole, and
the outer peripheral surface of the adjustment rod is urged toward a surface, which is distant from the steering column in the vertical direction, of the upper and lower surfaces of the inner surface of the through-hole arranged in one support plate part-side, by an elastic member.

* * * * *